US012334236B2

(12) United States Patent
Liu et al.

(10) Patent No.: US 12,334,236 B2
(45) Date of Patent: Jun. 17, 2025

(54) ANISOTROPIC NANOCRYSTALLINE RARE EARTH PERMANENT MAGNET AND PREPARATION METHOD THEREOF

(71) Applicant: SICHUAN UNIVERSITY, Sichuan (CN)

(72) Inventors: Ying Liu, Sichuan (CN); Renquan Wang, Sichuan (CN); Jun Li, Sichuan (CN); Hongxing Chen, Sichuan (CN); Yao Xiao, Sichuan (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/721,567

(22) PCT Filed: Dec. 21, 2023

(86) PCT No.: PCT/CN2023/140453
§ 371 (c)(1),
(2) Date: Jun. 18, 2024

(87) PCT Pub. No.: WO2024/169395
PCT Pub. Date: Aug. 22, 2024

(65) Prior Publication Data
US 2024/0420873 A1 Dec. 19, 2024

(30) Foreign Application Priority Data
Feb. 16, 2023 (CN) ......................... 202310120822.2

(51) Int. Cl.
*H01F 1/057* (2006.01)
*B22F 1/00* (2022.01)
(Continued)

(52) U.S. Cl.
CPC .............. *H01F 1/0577* (2013.01); *B22F 1/09* (2022.01); *B22F 3/14* (2013.01); *B22F 3/16* (2013.01);
(Continued)

(58) Field of Classification Search
CPC ..... H01F 1/057–0578; C22C 9/00; B22F 1/09
See application file for complete search history.

(56) References Cited

U.S. PATENT DOCUMENTS 5,716,462 A * 2/1998 Sakurada .............. H01F 1/0578 252/62.54
10,464,132 B2 * 11/2019 Sakuma .................... H01F 1/06
2021/0407713 A1 * 12/2021 Luo .................... H01F 41/0293

FOREIGN PATENT DOCUMENTS

CN 103971875 A * 8/2014
CN 105321645 A 2/2016
(Continued)

OTHER PUBLICATIONS

Fuerst, et al., Enhanced coercivities in die-upset Nd13 Fe—B magnets with diffusion-alloyed additives (Zn, Cu, and Ni), Applied Physics Letters, 56, pp. 2252-2254, May 1990.
(Continued)

*Primary Examiner* — Sally A Merkling
*Assistant Examiner* — Austin Pollock
(74) *Attorney, Agent, or Firm* — Bryan D. Zerhusen, Esq.; Nicholas R. Herrel, Esq.; CANTOR COLBURN LLP

(57) ABSTRACT

Disclosed are an anisotropic nanocrystalline rare earth permanent magnet and a preparation method thereof. The rare earth permanent magnet includes an RE-Fe—B matrix phase and a second phase, wherein the RE-Fe—B matrix phase includes main phase $RE_2Fe_{14}B$ flaky nanocrystallines regularly arranged and an RE-rich phase around main phase
(Continued)

grains, the main phase $RE_2Fe_{14}B$ flaky nanocrystallines having an average grain size in a length direction of 70 nm to 800 nm and an average grain size in a thickness direction of 30 nm to 200 nm; and the second phase includes at least one selected from the group consisting of an M-Cu phase and an M-Cu—O phase, M being at least one selected from the group consisting of Ca and Mg.

11 Claims, 26 Drawing Sheets

(51) Int. Cl.

| | |
|---|---|
| ***B22F 3/14*** | (2006.01) |
| ***B22F 3/16*** | (2006.01) |
| ***B22F 3/20*** | (2006.01) |
| ***B22F 9/00*** | (2006.01) |
| ***B22F 9/04*** | (2006.01) |
| ***C22C 9/00*** | (2006.01) |
| ***C22C 23/00*** | (2006.01) |
| ***C22C 24/00*** | (2006.01) |
| ***C22C 38/00*** | (2006.01) |
| ***C22C 38/10*** | (2006.01) |
| ***H01F 41/02*** | (2006.01) |

(52) U.S. Cl.

CPC ................ *B22F 3/20* (2013.01); *B22F 9/008* (2013.01); *B22F 9/04* (2013.01); *C22C 9/00* (2013.01); *C22C 23/00* (2013.01); *C22C 24/00* (2013.01); *C22C 38/002* (2013.01); *C22C 38/005* (2013.01); *C22C 38/10* (2013.01); *H01F 1/0571* (2013.01); *H01F 41/0273* (2013.01); *B22F 2003/208* (2013.01); *B22F 2201/20* (2013.01); *B22F 2202/05* (2013.01); *B22F 2301/355* (2013.01); *B22F 2998/10* (2013.01); *C22C 2202/02* (2013.01)

(56) References Cited

FOREIGN PATENT DOCUMENTS

| | | | | | |
|---|---|---|---|---|---|
| CN | 105321646 | A | * | 2/2016 | |
| CN | 106548844 | A | | 3/2017 | |
| CN | 108022707 | A | * | 5/2018 | ................ C22F 1/16 |
| CN | 112941457 | A | * | 6/2021 | ............ B22F 1/0059 |
| CN | 113223846 | A | * | 8/2021 | |
| CN | 116230346 | A | | 6/2023 | |
| DE | 102015220337 | A1 | * | 4/2017 | |
| JP | 2019044259 | A | | 3/2019 | |

OTHER PUBLICATIONS

International Search Report and Written Opinion for PCT/CN2023/140453 Dated Mar. 6, 2024.

Tieqiao Zhang, et al., Coercivity and remanence enhancement in hot-deformed Nd—Fe—B magnets by high-temperature short-term annealing process, journal of Alloys and Compounds, vol. 903, May 2022, 163975, ISSN 0925-8388.

* cited by examiner

ANISOTROPIC NANOCRYSTALLINE RARE EARTH PERMANENT MAGNET AND PREPARATION METHOD THEREOF

CROSS REFERENCE TO RELATED APPLICATION

The present application is a national stage application of International Patent Application No. PCT/CN2023/140453, filed on Dec. 21, 2023, which The present application claims priority to the Chinese Patent Application No. CN202310120822.2, filed with the China National Intellectual Property Administration (CNIPA) on Feb. 16, 2023, and entitled "ANISOTROPIC NANOCRYSTALLINE RARE EARTH PERMANENT MAGNET AND PREPARATION METHOD THEREOF". The disclosure of the two applications is incorporated by references herein in their entireties as part of the present application.

TECHNICAL FIELD

The present disclosure relates to the technical field of rare earth permanent magnet materials, and in particular to an anisotropic nanocrystalline rare earth permanent magnet and a preparation method thereof.

BACKGROUND

RE-Fe—B rare earth permanent magnet alloy is a permanent magnet material with the highest application performance due to its excellent hard magnetic properties, and has become an indispensable basic material for the development of modern industrial society. In recent years, with the continuous development of industrial technology and the continuous expansion in application range of the RE-Fe—B permanent magnet materials, higher requirements has been emposed for the magnetic properties of RE-Fe—B permanent magnet materials. Therefore, the development of high-performance RE-Fe—B permanent magnet materials has become a hot topic in high-tech research and development of various countries around the world.

Compared with RE-Fe—B rare earth permanent magnets with micron crystal structure, nanocrystalline RE-Fe—B rare earth permanent magnets show better corrosion- and temperature-resistance due to their rich grain boundary structure(s), thus achieving a higher coercive force at the same rare earth content. Accordingly, the nanocrystalline RE-Fe—B has become the most potential rare earth permanent magnet material. Under ideal conditions, the magnetic properties of anisotropic nanocrystalline RE-Fe—B rare earth permanent magnets are twice that of isotropic nanocrystalline RE-Fe—B rare earth permanent magnets. However, a coercive force of the anisotropic nanocrystalline RE-Fe—B rare earth permanent magnet prepared in the actual production process is still far lower than the theoretical value. Currently, researchers have tried a variety of experimental approaches to improve the coercive force of rare earth permanent magnets.

Fuerst and Brewer et al. reported that an isolation effect of non-magnetic Cu element at the grain boundary could partially improve a magnet coercivity (Fuerst C D, Brewer E G, "Enhanced coercivities in die-upset Nd—Fe—B magnets with diffusion-alloyed additives (Zn, Cu, and Ni)", *Applied physics letters,* 1990, 56 (22): 2252-2254.). Since then, a large amount of scientific research work has been done to improve the grain boundary phase by adding low-melting RE-Cu phase at the grain boundary to improve the magnet coercivity. However, the use of RE elements in a large amount inevitably leads to an increase in material preparation cost. Chinese patent application No. 201510834685.4 discloses a method for preparing a nanocrystalline rare earth permanent magnet material with a high coercivity by thermal deformation. In this method, the coercive force of the magnet is improved by adding a high-melting WC phase. However, the WC phase could react with an Nd-rich phase and a main phase $RE_2Fe_{14}B$, limiting the further improvement of magnetic properties. Zhang et al. optimized the Nd-rich phase distribution through appropriate heat treatment processes, allowing part of the Nd-rich phase located at a magnetic powder interface to diffuse into the magnetic powder, thereby improving the magnet coercivity (Zhang T, Liu S, Wu Z, et al, "Coercivity and remanence enhancement in hot-deformed Nd—Fe—B magnets by high-temperature short-term annealing process", *Journal of Alloys and Compounds,* 2022, 903:163975.). However, there are still a large number of rare earth oxides at the magnetic powder interface, and it is difficult for high-melting rare earth oxides to enter the magnetic powder, which limits further improvement of the coercive force of the magnet.

Therefore, it has become an urgent problem to be solved to cost-effectively improve the coercive force of anisotropic nanocrystalline rare earth permanent magnets.

SUMMARY

An object of the present disclosure is to provide an anisotropic nanocrystalline rare earth permanent magnet and a preparation method thereof, which can cost-effectively improve a coercive force of the anisotropic nanocrystalline rare earth permanent magnet.

In a first aspect, the present disclosure provides an anisotropic nanocrystalline rare earth permanent magnet, as described in the following technical solutions.

Provided is an anisotropic nanocrystalline rare earth permanent magnet, including an RE-Fe—B matrix phase and a second phase, wherein

- the RE-Fe—B matrix phase includes main phase $RE_2Fe_{14}B$ flaky nanocrystallines regularly arranged and an RE-rich phase around main phase grains, the main phase $RE_2Fe_{14}B$ flaky nanocrystallines having an average grain size in a length direction of 70 nm to 800 nm and an average grain size in a thickness direction of 30 nm to 200 nm, and each having a length-to-thickness ratio of greater than 1.2:
- the RE-Fe—B matrix phase comprises a coarse-grained region having a volume fraction of not more than 10%, which is calculated based on a volume of the coarse-grained region and a volume of the rare earth permanent magnet, the coarse-grained region being an equiaxed grain region with a grain size of greater than 500 nm; and
- the second phase comprises at least one selected from the group consisting of an M-Cu phase and an M-Cu—O phase, M being at least one selected from the group consisting of Ca and Mg.

In some embodiments, the rare earth permanent magnet is prepared from a raw material powder obtained by mixing an RE-Fe—B magnetic powder and an M-Cu alloy powder, wherein M is at least one selected from the group consisting of Ca and Mg, and the RE-Fe—B magnetic powder has a chemical formula of $RE_xFe_{100-x-y-z}TM_yB_z$, wherein

- RE is at least one selected from the group consisting of La, Ce, Pr, Nd, Y, Dy, Tb, and Ho;

TM is at least one selected from the group consisting of Co, Zr, Cr, V, Nb, Si, Ti, Mo, Mn, W, Ga, Cu, Al, and Zn; and x, y, and z each represent a mass fraction of an element, and satisfy inequalities: $26.0 \leq x \leq 36.0, 0.14 \leq y \leq 8.0, 0.8 \leq z \leq 1.36$.

In some embodiments, the M-Cu alloy powder is in an amount of 0.1 wt. % to 5.0 wt. % based on a mass of the RE-Fe—B magnetic powder.

In some embodiments, the M-Cu alloy powder is a Ca—Cu alloy powder, and the Ca—Cu alloy powder has 10 wt. % to 60 wt. % of Cu: or the M-Cu alloy powder is a Mg—Cu alloy powder, and the Mg—Cu alloy powder has 1 wt. % to 50 wt. % of Cu: or the M-Cu alloy powder is a Ca—Mg—Cu alloy powder, and the Ca—Mg—Cu alloy powder has 10 wt. % to 50 wt. % of Cu.

In some embodiments, the coarse-grained region in the RE-Fe—B matrix phase has the volume fraction of not more than 1%.

In a second aspect, the present disclosure provides a method for preparing the anisotropic nanocrystalline rare earth permanent magnet, including the following steps:

mixing the RE-Fe—B magnetic powder with the M-Cu alloy powder to obtain the raw material powder, wherein M is at least one selected from the group consisting of Ca and Mg, the RE-Fe—B magnetic powder includes at least one selected from the group consisting of an anisotropic magnetic powder and an isotropic magnetic powder, and the raw material powder includes at least one selected from the group consisting of an anisotropic raw material powder and an isotropic raw material powder; and subjecting the raw material powder to thermal processing, such that the main phase $RE_2Fe_{14}B$ flaky nanocrystallines are regularly arranged, to obtain the anisotropic nanocrystalline rare earth permanent magnet.

In some embodiments, the RE-Fe—B magnetic powder includes a nanocrystalline magnetic powder or an amorphous magnetic powder:

the nanocrystalline magnetic powder has a structure selected from the group consisting of an equiaxed crystal structure and a flaky crystal structure: in the equiaxed crystal structure, an average grain size is in a range of 10 nm to 400 nm; and in the flaky crystal structure, an average grain size in a length direction of grains is in a range of 20 nm to 500 nm, and an average grain size in a thickness direction of the grains is in a range of 10 nm to 200 nm.

In some embodiments, the RE-Fe—B magnetic powder includes a flaky magnetic powder, a granular magnetic powder, or an irregular magnetic powder; and the flaky magnetic powder has a length-to-thickness ratio of 1.2 to 30.

In some embodiments, the thermal processing includes at least one selected from the group consisting of thermal deformation, thermal extrusion deformation, magnetic field-oriented sintering molding, and mechanically-oriented sintering molding.

In some embodiments, the thermal deformation includes the following steps:

preparing the raw material powder at a temperature ranging from room temperature to 800° C. into a green body with a density of 50% to 99.99%; and subjecting the green body to the thermal deformation at a temperature of 600° C. to 850° C. to reach a deformation amount of 30% to 90% at a deformation rate of 0.01 mm/s to 3.5 mm/s such that the main phase $RE_2Fe_{14}B$ flaky nanocrystallines are regularly arranged.

In some embodiments, the thermal extrusion deformation includes the following steps:

preparing the raw material powder at a temperature ranging from room temperature to 800° C. into a green body with a density of 50% to 99.99%; and subjecting the green body to the thermal extrusion deformation at a temperature of 600° C. to 850° C. such that the main phase $RE_2Fe_{14}B$ flaky nanocrystallines are regularly arranged.

In some embodiments, the thermal extrusion deformation includes the following steps: subjecting the raw material powder to the thermal extrusion deformation at a temperature of 600° C. to 850° C. such that the main phase $RE_2Fe_{14}B$ flaky nanocrystallines are regularly arranged.

In some embodiments, the magnetic field-oriented sintering molding includes the following steps:

subjecting the anisotropic raw material powder to oriented molding under an external magnetic field of 1 T to 3 T to obtain a molded green body; and subjecting the molded green body to hot pressing sintering or pressureless sintering.

In some embodiments, the hot pressing sintering is conducted at a temperature of 450° C. to 850° C. and a pressure of 50 MPa to 500 MPa for 1 min to 60 min.

In some embodiments, the pressureless sintering is conducted at a temperature of 600° C. to 850° C. for 10 min to 120 min.

In some embodiments, the mechanically-oriented sintering molding includes the following steps:

subjecting the anisotropic raw material powder to hot-pressing oriented sintering at a temperature of 450° C. to 850° C. under a uniaxial pressure of 50 MPa to 500 MPa for 1 min to 60 min, where the RE-Fe—B magnetic powder of the anisotropic raw material powder is a flaky magnetic powder with a length-to-thickness ratio of 1.2 to 30; and the flaky magnetic powder has an easy magnetization direction parallel to a thickness direction of the flaky magnetic powder.

In some embodiments, the mechanically-oriented sintering molding includes the following steps: subjecting the anisotropic raw material powder to cold pressing molding at room temperature under a uniaxial pressure to obtain a molded green body, wherein the RE-Fe—B magnetic powder of the anisotropic raw material powder is a flaky magnetic powder with a length-to-thickness ratio of 1.2 to 30; the flaky magnetic powder has an easy magnetization direction parallel to a thickness direction of the flaky magnetic powder; and the molded green body has a density of 40% to 70%; and subjecting the molded green body to pressureless sintering at a temperature of 600° C. to 850° C. for 10 min to 120 min.

To sum up, embodiments of the present disclosure have the following beneficial effects:

1. The present disclosure provides an anisotropic nanocrystalline rare earth permanent magnet. The rare earth permanent magnet includes an RE-Fe—B matrix phase and a second phase, wherein the RE-Fe—B matrix phase includes main phase $RE_2Fe_{14}B$ flaky nanocrystallines regularly arranged and an RE-rich phase around main phase grains; and the second phase includes at least one selected from the group consisting of an M-Cu phase and an M-Cu—O phase, and M is at least one selected from the group consisting of Ca and Mg. Ca and/or Mg in the M-Cu alloy could reduce the rare earth oxides at the RE-Fe—B magnetic powder interface, which is beneficial to eliminating the rare earth oxides at the interface and improving the distribution of the rare earth-rich phase. Moreover, the enrichment of the rare earth-rich phase is inhibited at the magnetic powder interface, improving the content of the rare earth-rich phase between the main phase grains inside the magnetic powder. In addition, the second phase distributed at the magnetic powder interface inhibits the formation of coarse grains at the magnetic powder interface and is conducive to refining the grains of the main phase $RE_2Fe_{14}B$ flaky nanocrystallines, thus optimizing the microstructure of the anisotropic nanocrystalline rare earth permanent magnet and improving the coercive force of the magnet.

2. In the present disclosure, the method for preparing the anisotropic nanocrystalline rare earth permanent magnet has a simple process. Moreover, the M-Cu alloy raw material added is easily available, low in cost, and does not react with the main phase $RE_2Fe_{14}B$. The preparation process is highly controllable and avoids a cost increase caused by additional addition of rare earth elements. The obtained anisotropic nanocrystalline permanent magnet has excellent performance is economical and efficient, and thus is suitable for industrial mass production.

DETAILED DESCRIPTION OF THE EMBODIMENTS

Figure 1:
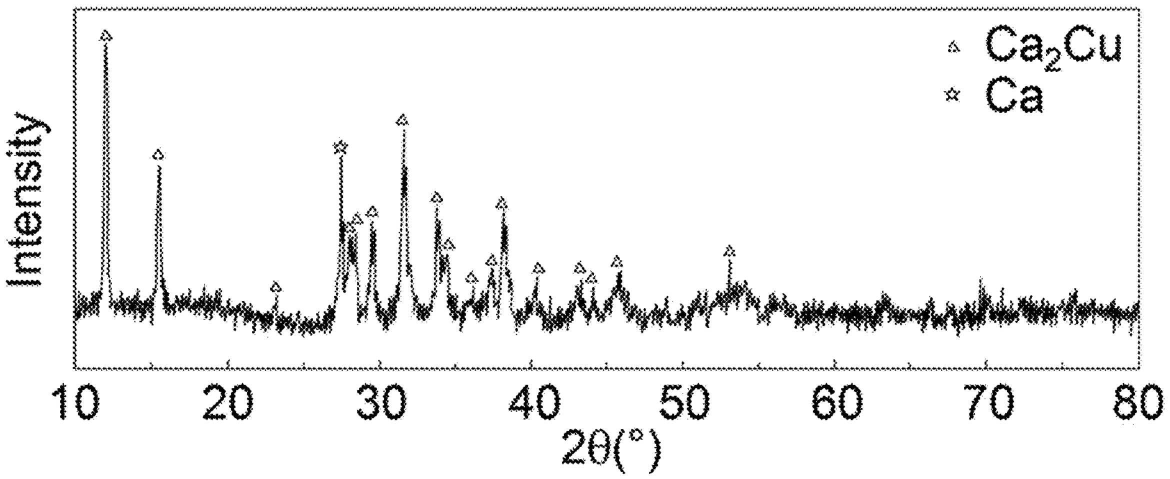
FIG. 1 shows an X-ray diffraction (XRD) pattern of a Ca—Cu alloy powder prepared from $Ca_{70}Cu_{30}$ alloy in Example 1.

The present disclosure provides an anisotropic nanocrystalline rare earth permanent magnet and a preparation method thereof. To make the objects, technical solutions, and effects of the present disclosure clearer, the following further describes the present disclosure in detail. It should be understood that the specific embodiments described herein are merely intended to explain the present disclosure, but not to limit the present disclosure.

At present, there are two main methods for preparing the anisotropic nanocrystalline RE-Fe—B rare earth permanent magnet. The first method is to densify nanocrystalline or amorphous magnetic powder into a green body, and then thermoplastic processing is conducted on the green body, such that the main phase $RE_2Fe_{14}B$ flaky nanocrystallines in the green body are regularly arranged through thermal coupling, that is to say, c-axes of the main phase $RE_2Fe_{14}B$ flaky nanocrystallines are arranged parallel, to prepare the anisotropic nanocrystalline rare earth permanent magnet. The second method is to subject anisotropic magnetic powder with a nanocrystalline structure to magnetic field orientation and sintering density to prepare the anisotropic nanocrystalline rare earth permanent magnet.

After long-term research, the applicant has found that although nanocrystal grains with a single domain size is realized in the anisotropic nanocrystalline RE-Fe—B rare earth permanent magnet through preparation process control, its coercive force is far lower than an empirically expected value. This is mainly related to the microstructure of the magnet. Anisotropic nanocrystalline rare earth permanent magnets include main phase $RE_2Fe_{14}B$ flaky nanocrystallines and an RE-rich phase distributed around the main phase grains. The former imparts the magnet with high saturation magnetization, and the latter's demagnetizing coupling ensures that the magnet shows a high coercive force. As a result, the grain size of the main phase and the composition and distribution of the RE-rich phase both are the determinants of the coercive force of rare earth permanent magnets. After extensive research, the applicant has also found that there are three main reasons for the decrease in coercive force of anisotropic nanocrystalline RE-Fe—B rare earth permanent magnet. On one hand, during the preparation, stress concentration and local overheating occur at the magnetic powder interface, and the grains in the interface region are prone to abnormal growth, forming coarse grains and resulting in a reduction in coercive force. On the other hand, there is a high ferromagnetic element content in the grain boundary phase between the main phase nano-grains, and exchange coupling occurs between the main phase grains, resulting in a reduction in the coercive force. Finally, the rare earth-rich phase is highly active and could be rapidly oxidized at room temperature into rare earth oxides, which reduce a demagnetizing coupling effect of the rare earth-rich phase, resulting in a reduction in the coercive force.

During the research, the applicant has surprisingly discovered that by alloying Ca and/or Mg with Cu, an M-Cu alloy with low melting points could be generated, namely a Ca—Cu alloy (~490° C.), an Mg—Cu alloy (~485° C.), or a Ca—Mg—Cu alloy. The added M-Cu alloy does not react with the main phase $RE_2Fe_{14}B$, and low-melting M-Cu alloy could flow and diffuse during the magnet preparation process to achieve uniform distribution without breaking into extremely fine powder, thus avoiding serious oxidation of Ca or Mg. Compared with elemental Ca and Mg powders, the M-Cu alloy has better oxidation resistance, thus retaining the reducing activity of Ca and Mg, which could reduce rare earth oxides on the surface of the RE-Fe—B magnetic powder during the thermal processing, thereby increasing the fluidity of the rare earth-rich phase, inhibiting the enrichment of the rare earth-rich phase at the interface, and thereby better diffusing onto the surface of the main phase grains inside the magnet. In view of this, a pinning effect of grain boundaries relative to magnetic domain walls is enhanced to improve the coercive force of the magnet. In addition, the M-Cu phase or the M-Cu—O phase generated in situ exists at the RE-Fe—B magnetic powder interface inside the magnet, and could inhibit the formation of coarse grains during thermal processing and is conducive to refining the main phase grains. This mechanism further improves the coercive force of anisotropic nanocrystalline rare earth permanent magnet.

The present disclosure is proposed based on the above researches.

The present disclosure provides an anisotropic nanocrystalline rare earth permanent magnet. The rare earth permanent magnet includes an RE-Fe—B matrix phase and a second phase, wherein the RE-Fe—B matrix phase includes main phase $RE_2Fe_{14}B$ flaky nanocrystallines regularly arranged and an RE-rich phase around main phase grains: c-axes of the main phase $RE_2Fe_{14}B$ flaky nanocrystallines are arranged in parallel: the main phase $RE_2Fe_{14}B$ flaky nanocrystallines have an average grain size in a length direction of 70 nm to 800 nm, preferably 100 nm to 600 nm, more preferably 150 nm to 400 nm, even more preferably 200 nm to 400 nm, even more preferably 210 nm to 350 nm, and even more preferably 230 nm to 300 nm; and have an average grain size in a thickness direction of 30 nm to 200 nm, preferably 50 nm to 150 nm, and more preferably 70 nm to 120 nm; and the flaky nanocrystallines each have a length-to-thickness ratio of greater than 1.2, preferably not less than 1.5, and more preferably not less than 2. The second phase includes at least one selected from the group consisting of an M-Cu phase and an M-Cu—O phase, and M is at least one selected from the group consisting of Ca and Mg.

In the present disclosure, the rare earth permanent magnet is prepared from a raw material powder obtained by mixing an RE-Fe—B magnetic powder and an M-Cu alloy powder, wherein M is at least one of Ca and Mg, the RE-Fe—B magnetic powder has a formula of $RE_xFe_{100-x-y-z}TM_yB_z$, wherein RE is one or more of La, Ce, Pr, Nd, Y, Dy, Tb, and Ho, preferably at least one of La, Ce, Pr, Nd, and Y: TM is one or more of Co, Zr, Cr, V, Nb, Si, Ti, Mo, Mn, W, Ga, Cu, Al, and Zn, preferably at least one of Co, Zr, Cr, V, Nb, Ga, and Mo; and x, y, and z each represent a mass fraction of an element, and satisfy inequalities: $26.0 \le x \le 36.0$, $0.14 \le y \le 8.0$, and $0.8 \le z \le 1.36$.

Based on a mass of the RE-Fe—B magnetic powder, the M-Cu alloy powder is added in an amount of 0.1-5.0 wt. %, preferably 0.5-3 wt. %, more preferably 0.5-2.0 wt. %, even more preferably 0.5-1.5 wt. %, and still even more preferably 0.5-1.0 wt. %. The M-Cu alloy powder is distributed at the magnetic powder interface inside the RE-Fe—B magnet. An insufficient addition amount is not conducive to improving grain boundary phase distribution and suppressing grain coarsening: while an excessive addition amount leads to agglomeration of the M-Cu alloy powder, which is not conducive to improving the performance of nanocrystalline rare earth permanent magnet. In some embodiments, the Ca—Cu alloy powder has a Cu mass percentage of 10-60 wt. %, preferably 15-55 wt. %, more preferably 20-50 wt. %. In some embodiments, the Mg—Cu alloy powder has a Cu mass percentage of 1-50 wt. %, preferably 5-45 wt. %, and more preferably 10-45 wt. %. In some embodiments, the Ca—Mg—Cu alloy powder has a Cu mass percentage of 10-50 wt. %. In some embodiments, the M-Cu alloy powder has an average particle size of not more than 300 μm, preferably not more than 200 μm, and more preferably not more than 100 μm. The M-Cu alloy powder partially reduces the rare earth oxides, forming the M-Cu—O phase, and the unreacted part remains as the M-Cu phase, which is distributed at the magnetic powder interface, inhibiting the growth of grains at the RE-Fe—B interface to form coarse grains. The RE-Fe—B matrix phase includes a coarse-grained region having a volume fraction of not more than 10%, which is calculated based on a volume of the coarse-grained region and a volume of the rare earth permanent magnet, the volume fraction is more preferably not more than 8%, even more preferably not more than 6%, even more preferably not more than 4%, even yet more preferably not more than 3%, even more preferably not more than 2%, even more preferably not more than 1% and not less than 0, or not less than 0.5%. The coarse-grained region refers to an equiaxed grain region with a grain size of greater than 500 nm, and a volume fraction of the coarse-grained region is calculated based on the volume of the coarse-grained region and the volume of the rare earth permanent magnet. Determination of the volume fraction of the coarse-grained region: a cross-section parallel to a c-axis (easy magnetization axis) of the magnet is tested by SEM, and then an average value of a ratio of the sum of the coarse-grained region area to a total area of the magnet in 5 low-magnification SEM images is averaged. In some embodiments, the low-magnification SEM images have a magnification of 500 times or other magnifications, whichever could achieve the measurement of the area of the coarse-grained region.

The present disclosure provides a method for preparing the anisotropic nanocrystalline rare earth permanent magnet, including the following steps:

S1, mixing the RE-Fe—B magnetic powder with the M-Cu alloy powder to obtain the raw material powder, wherein M is at least one selected from the group consisting of Ca and Mg, the RE-Fe—B magnetic powder includes at least one selected from the group consisting of an anisotropic magnetic powder and an isotropic magnetic powder, and the raw material powder obtained by mixing includes at least one selected from the group consisting of an anisotropic raw material powder and an isotropic raw material powder; and S2, subjecting the raw material powder obtained in step S1 to thermal processing, such that the main phase $RE_2Fe_{14}B$ flaky nanocrystallines are regularly arranged to obtain the anisotropic nanocrystalline rare earth permanent magnet.

In some embodiments, the RE-Fe—B magnetic powder adopts a nanocrystalline magnetic powder or an amorphous magnetic powder: the nanocrystalline magnetic powder has a structure of an equiaxed crystal structure or a flaky crystal structure: in the equiaxed crystal structure, an average grain size is in a range of 10 nm to 400 nm, preferably 30 nm to 200 nm, and more preferably 35 nm to 150 nm; and in the flaky crystal structure, an average grain size in a length direction of grains is in a range of 20 nm to 500 nm, preferably 50 nm to 400 nm, and more preferably 100 nm to 300 nm; and an average grain size in a thickness direction of the grains is in a range of 10 nm to 200 nm, preferably 30 nm to 150 nm, and more preferably 50 nm to 100 nm. In some embodiments, the RE-Fe—B magnetic powder is a flaky magnetic powder, a granular magnetic powder, or an irregular magnetic powder, wherein the flaky magnetic powder has a length-to-thickness ratio of 1.2 to 30, preferably 1.5 to 30, more preferably 2 to 20, even more preferably 3 to 15, and even more preferably 5 to 10. In some embodiments, an easy magnetization direction of the anisotropic flaky magnetic powder is parallel to a thickness direction of the magnetic powder.

In some embodiments, in step S2, the thermal processing includes at least one of thermal deformation, thermal extrusion deformation, magnetic field-oriented sintering molding, and mechanically-oriented sintering molding.

In some specific embodiments, the thermal deformation includes the following steps:

S2.1, preparing the raw material powder at a temperature ranging from room temperature to 800° C. into a green body with a density of 50% to 99.99%, preferably 70% to 99.99%, more preferably 80% to 99.99%, and even more preferably 90% to 99.99%; and S2.2, subjecting the green body to the thermal deformation at a temperature of 600° C. to 850° C., preferably 650° C. to 800° C. to reach a deformation amount of 30% to 90%, preferably 50% to 80%, and more preferably 55% to 75% at a deformation rate of 0.01 mm/s to 3.5 mm/s, preferably 0.1 mm/s to 2 mm/s, such that the main phase $RE_2Fe_{14}B$ flaky nanocrystallines are regularly arranged.

In some specific embodiments, the thermal extrusion deformation includes the following steps:

S2.1, preparing the raw material powder at a temperature ranging from room temperature to 800° C. into a green body: preferably, preparing the nanocrystalline mixed magnetic powder into the green body at a temperature ranging from room temperature to 700° C., or preparing the amorphous mixed magnetic powder into the green body at a temperature of 600° C. to 750° C., wherein the green body has a density of 50% to 99.99%, preferably 70% to 99.99%, more preferably 80% to 99.99%, and even more preferably 90% to 99.99%; and S2.2, subjecting the green body to the thermal extrusion deformation at a temperature of 600° C. to 850° C., preferably 650° C. to 800° C. such that main phase $RE_2Fe_{14}B$ flaky nanocrystallines are regularly arranged: or the following steps:

S2', subjecting the raw material powder to the thermal extrusion deformation at a temperature of 600° C. to 850° C., preferably 650° C. to 800° C. such that the main phase $RE_2Fe_{14}B$ flaky nanocrystallines are regularly arranged.

In some embodiments, the magnetic field-oriented sintering molding includes the following steps:

S2.1, subjecting the anisotropic raw material powder to oriented molding under an external magnetic field of 1 T to 3 T, preferably 1.5 T to 3 T to obtain a molded green body; and S2.2, subjecting the molded green body to hot pressing sintering at a temperature of 450° C. to 850° C., preferably 650° C. to 800° C. and a pressure of 50 MPa to 500 MPa, preferably 50 MPa to 300 MPa for 1 min to 60 min, preferably 5 min to 30 min; or S2.2', subjecting the molded green body to pressureless sintering at a temperature of 600° C. to 850° C., preferably 650° C. to 800° C. for 10 min to 120 min, preferably 10 min to 60 min.

In some embodiments, the mechanically-oriented sintering molding includes the following steps:

S2', subjecting the anisotropic raw material powder to hot-pressing oriented sintering at a temperature of 450° C. to 850° C., preferably 650° C. to 800° C. under a uniaxial pressure of 50 MPa to 500 MPa, preferably 50 MPa to 230 MPa for 1 min to 60 min, preferably 5 min to 30 min, wherein the RE-Fe—B magnetic powder of the anisotropic raw material powder is a flaky magnetic powder with a length-to-thickness ratio of 1.2 to 30, preferably 1.5 to 30; and the flaky magnetic powder has an easy magnetization direction parallel to a thickness direction of the magnetic powder: or the following steps:

S2.1", subjecting the anisotropic raw material powder to cold-pressing molding at room temperature under a uniaxial pressure to obtain a molded green body, wherein the RE-Fe—B magnetic powder of the anisotropic raw material powder is a flaky magnetic powder with a length-to-thickness ratio of 1.2 to 30, preferably 1.5 to 30; the flaky magnetic powder has an easy magnetization direction parallel to a thickness direction of the magnetic powder; and the molded green body has a density of 40% to 70%, preferably 50% to 70%; and S2.2", subjecting the molded green body to pressureless sintering at a temperature of 600° C. to 850° C., preferably 650° C. to 800° C. for 10 min to 120 min, preferably 10 min to 60 min.

The present disclosure is further described below through specific examples.

Example 1

This example provided an anisotropic nanocrystalline rare earth permanent magnet and a preparation method thereof, wherein the preparation method was as follows.

S1. An alloy ingot with a chemical formula of $Nd_{29.89}Fe_{62.62}Co_{5.93}Ga_{0.64}B_{0.92}$ (wt. %) was subjected to melt-spinning at a linear speed of a fast quenching roller of 28 m/s, to obtain a nanocrystalline rapidly-quenched magnetic powder with a particle size of 50 μm to 450 μm, wherein the nanocrystalline rapidly-quenched magnetic powder was an isotropic magnetic powder with an equiaxed crystal structure, and in the equiaxed crystal structure, an average grain size was 40 nm. An alloy ingot with a chemical formula of $Ca_{70}Cu_{30}$ (wt. %) was mechanically crushed to obtain an alloy powder with an average particle size of 100 μm, and a phase of the alloy powder was determined by XRD. As shown in FIG. 1, the alloy powder included a Ca phase and a $Ca_2Cu$ phase, and the crushed alloy powder was not oxidized. The $Ca_{70}Cu_{30}$ alloy powder and the nanocrystalline rapidly-quenched magnetic powder were mixed three-dimensionally for 2 h under a protective atmosphere of argon to obtain a raw material powder, wherein the raw material powder was an isotropic raw material powder. In the prepared raw material powder, the $Ca_{70}Cu_{30}$ alloy powder was in an amount of 0.5 wt. %, 1.0 wt. %, 1.5 wt. %, and 2.0 wt. % of the nanocrystalline rapidly-quenched magnetic powder, respectively.

S2. The raw material powder prepared in S1 was subjected to thermal processing, specifically as follows:

S2.1, the raw material powders of different components were separately prepared into a green body under a vacuum degree of $1\times10^{-2}$ Pa and at a temperature of 650° C. and a pressure of 200 MPa, with a density of 99%; and S2.2, the green body was subjected to thermal deformation at 780° C. under a vacuum degree of $1\times10^{-2}$ Pa at a thermal deformation rate of 0.1 mm/s, a deformation amount in a height direction of the green body being 70%, to obtain an anisotropic nanocrystalline magnet.

Comparative Example 1

Comparative Example 1 was different from Example 1 in that the $Ca_{70}Cu_{30}$ alloy powder was not added to the nanocrystalline rapidly-quenched magnetic powder in Comparative Example 1, while the remaining preparation steps were the same as those in Example 1.

Comparative Example 2

Comparative Example 2 was different from Example 1 in that the $Al_{70}Cu_{30}$ alloy powder was added to the nanocrystalline rapidly-quenched magnetic powder in Comparative Example 2, and the $Al_{70}Cu_{30}$ alloy powder was added in an amount of 1 wt. % of a mass of the nanocrystalline rapidly-quenched magnetic powder: while the remaining preparation steps were the same as those in Example 1.

Table 1 shows the magnetic properties of different magnets prepared in Example 1, Comparative Example 1, and Comparative Example 2.

TABLE 1

Magnetic properties of anisotropic nanocrystalline magnets

| Alloy added | $B_r$ (kGs) | $H_{cj}$ (kOe) | $(BH)_{max}$ (MGOe) |
|---|---|---|---|
| 0 wt. % $Ca_{70}Cu_{30}$ | 13.60 | 14.15 | 42.5 |
| 0.5 wt. % $Ca_{70}Cu_{30}$ | 13.55 | 16.5 | 41.52 |
| 1.0 wt. % $Ca_{70}Cu_{30}$ | 13.49 | 17.70 | 41.41 |
| 1.5 wt. % $Ca_{70}Cu_{30}$ | 13.2 | 16.58 | 40.0 |
| 2.0 wt. % $Ca_{70}Cu_{30}$ | 13.12 | 15.8 | 38.2 |
| 1.0 wt. % $Al_{70}Cu_{30}$ | 13.12 | 16.54 | 39.95 |

Figure 2A:
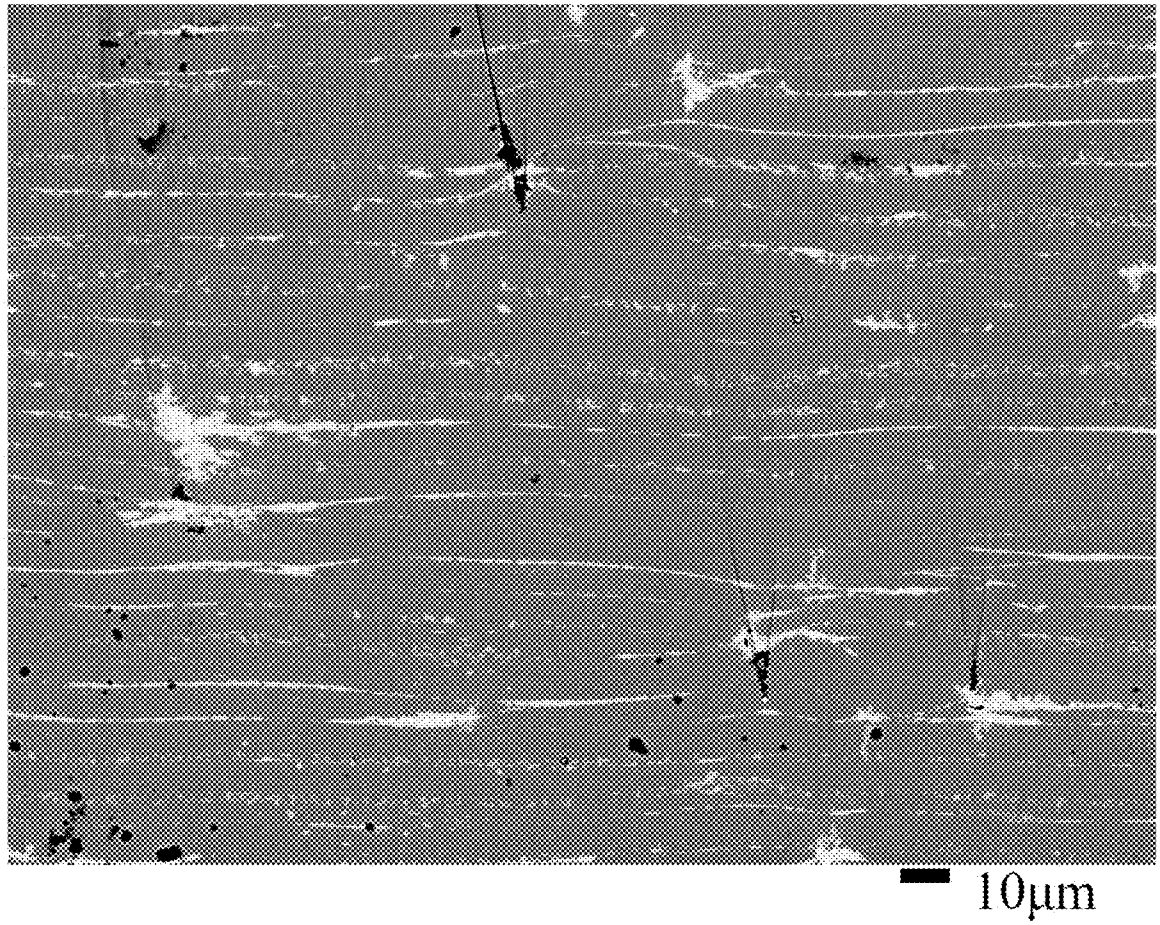
FIGS. 2A, 2B, and, 2C show scanning electron microscopy (SEM) images of a cross-section of the anisotropic nanocrystalline rare earth permanent magnet prepared in Comparative Example 1.
Figure 2B:
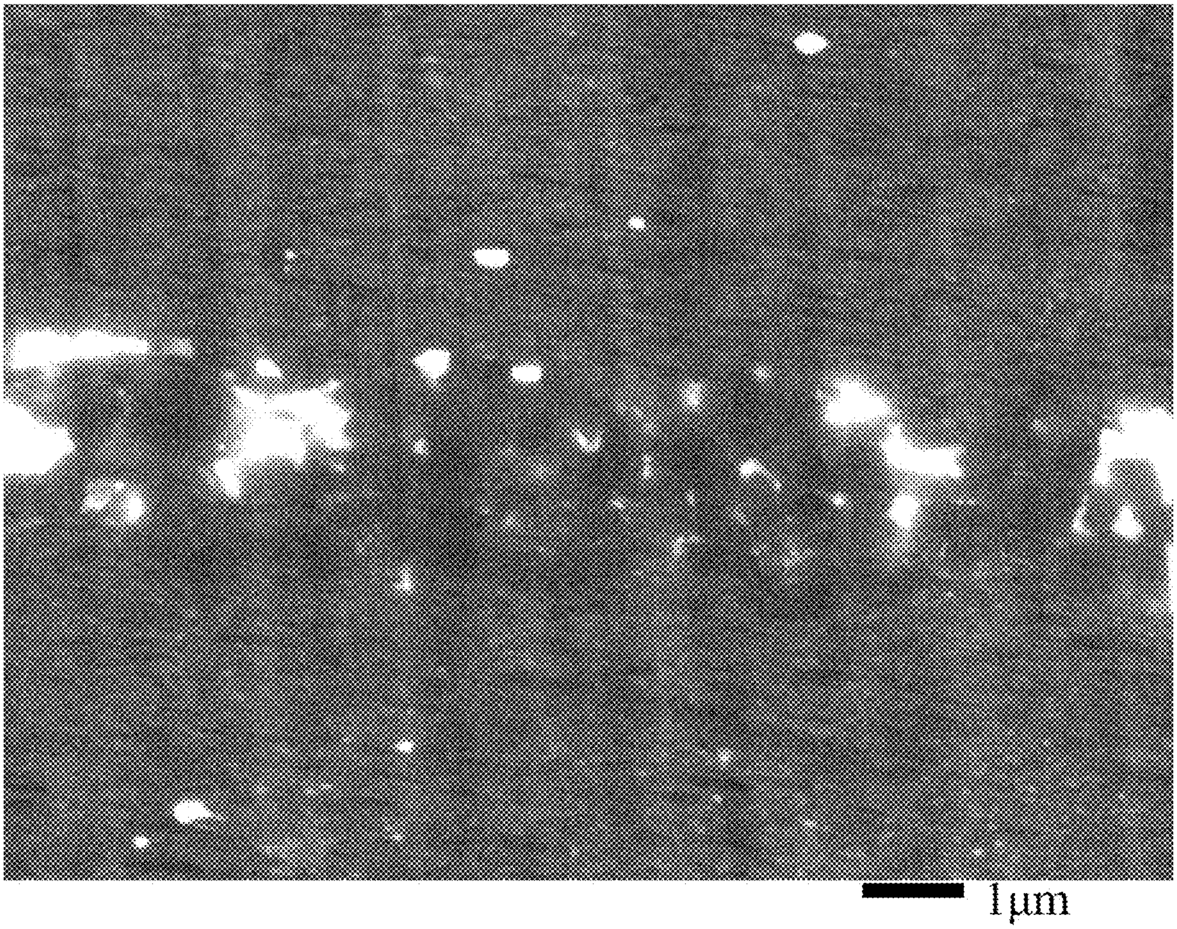
Figure 2C:
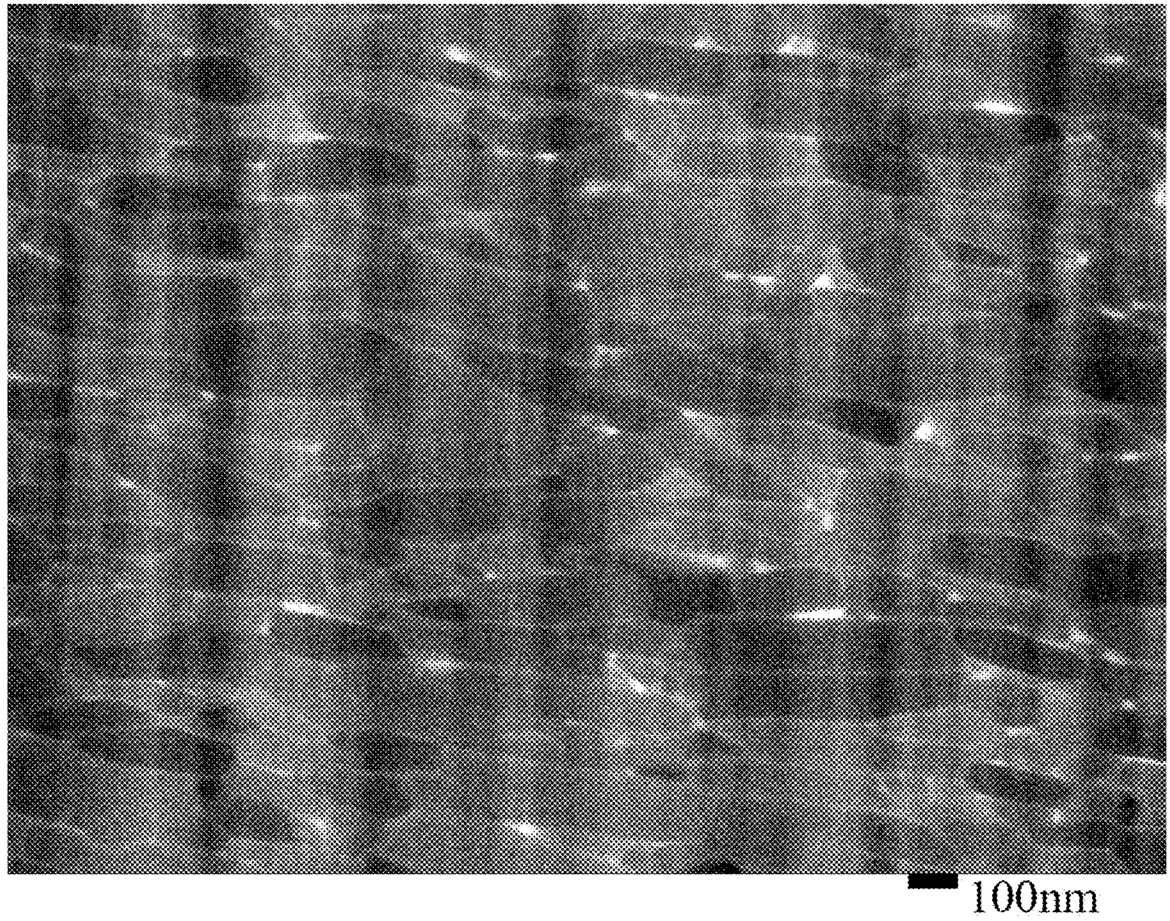

As shown in Table 1, a certain amount of the $Ca_{70}Cu_{30}$ alloy could significantly improve a coercive force of the anisotropic nanocrystalline rare earth permanent magnet, and the amount was preferably 0.5-1.5 wt. %, and optimally 0.5-1.0 wt. %. Combined with FIG. 2A, it can be seen that in the thermal deformation-based magnet without adding Ca—Cu alloy in Comparative Example 1, the white Nd-rich phase was enriched in the form of strips at the magnetic powder interface, and the independent point-like phases in the Nd-rich phase are rare earth oxides. As shown in FIG. 2B, there are coarse grains at the magnetic powder interface in the magnet. The coarse grains are equiaxed crystals, and an average grain size of the equiaxed crystals is 550 nm. A volume fraction of the coarse-grained region in the Nd—Fe—B matrix phase is 13.5%, and the volume fraction of the coarse-grained region was calculated based on a volume of the coarse-grained region and a volume of the rare earth permanent magnet. Determination of the volume fraction of the coarse-grained region: a cross-section parallel to the c-axis (easy magnetization axis) of the magnet was tested by SEM, and then a ratio of the sum of the coarse-grained region area to a total area of the magnet in 5 low-magnification (500 times) SEM images was averaged using Image-Pro Plus software. As shown in FIG. 2C, the Nd—Fe—B matrix phase includes regularly arranged main phase $Nd_2Fe_{14}B$ flaky nanocrystallines and an Nd-rich phase around main phase grains. C-axes (grain thickness direction) of the main phase $Nd_2Fe_{14}B$ flaky nanocrystallines are arranged in parallel. The main phase $Nd_2Fe_{14}B$ flaky nanocrystallines have an average grain size in the length direction of 300 nm and an average grain size in the thickness direction of 100 nm, and the flaky nanocrystallines each have a length-to-thickness ratio of 3.

Figure 3A:
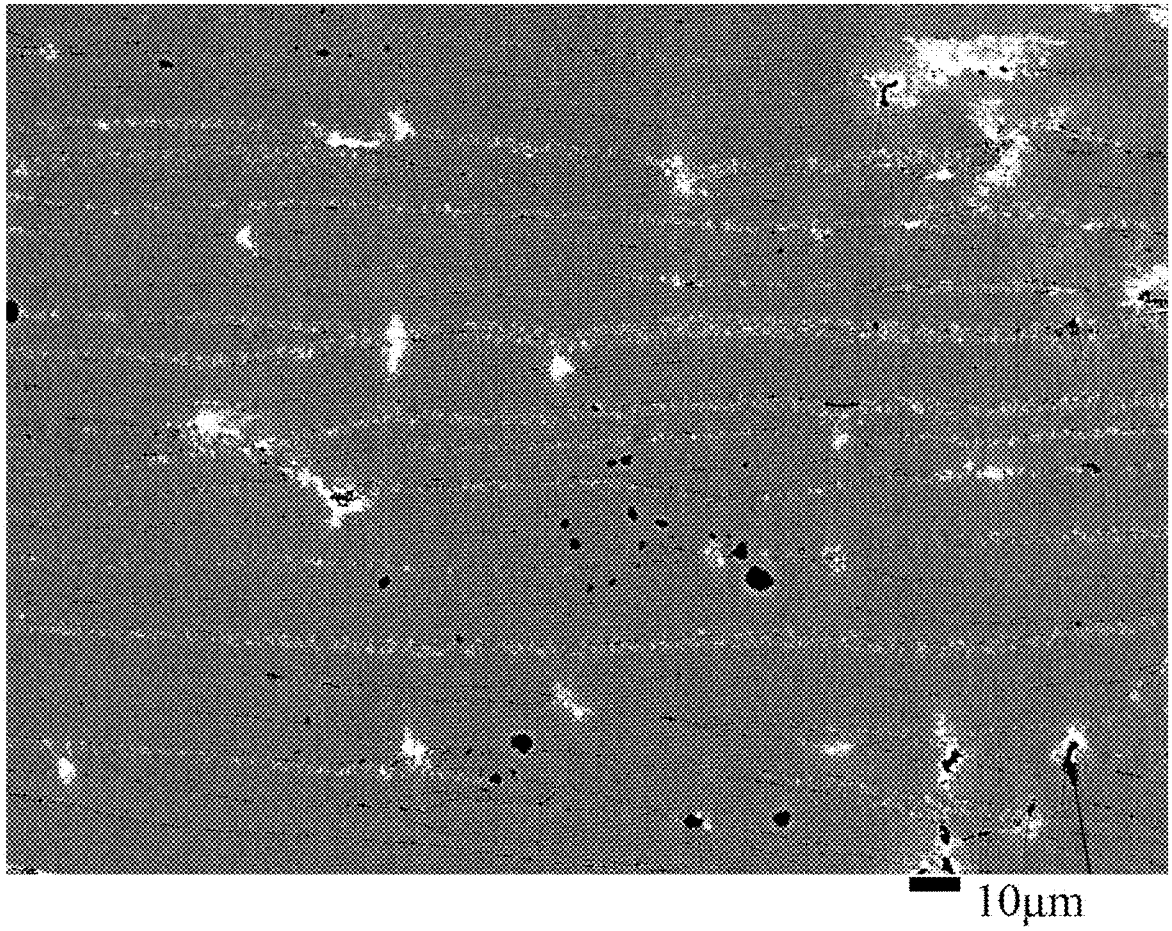
FIGS. 3A, 3B, and 3C show SEM images of cross-sections of anisotropic nanocrystalline rare earth permanent magnets prepared in Example 1 with 0.5 wt. % of Ca—Cu alloy powder.
Figure 3B:
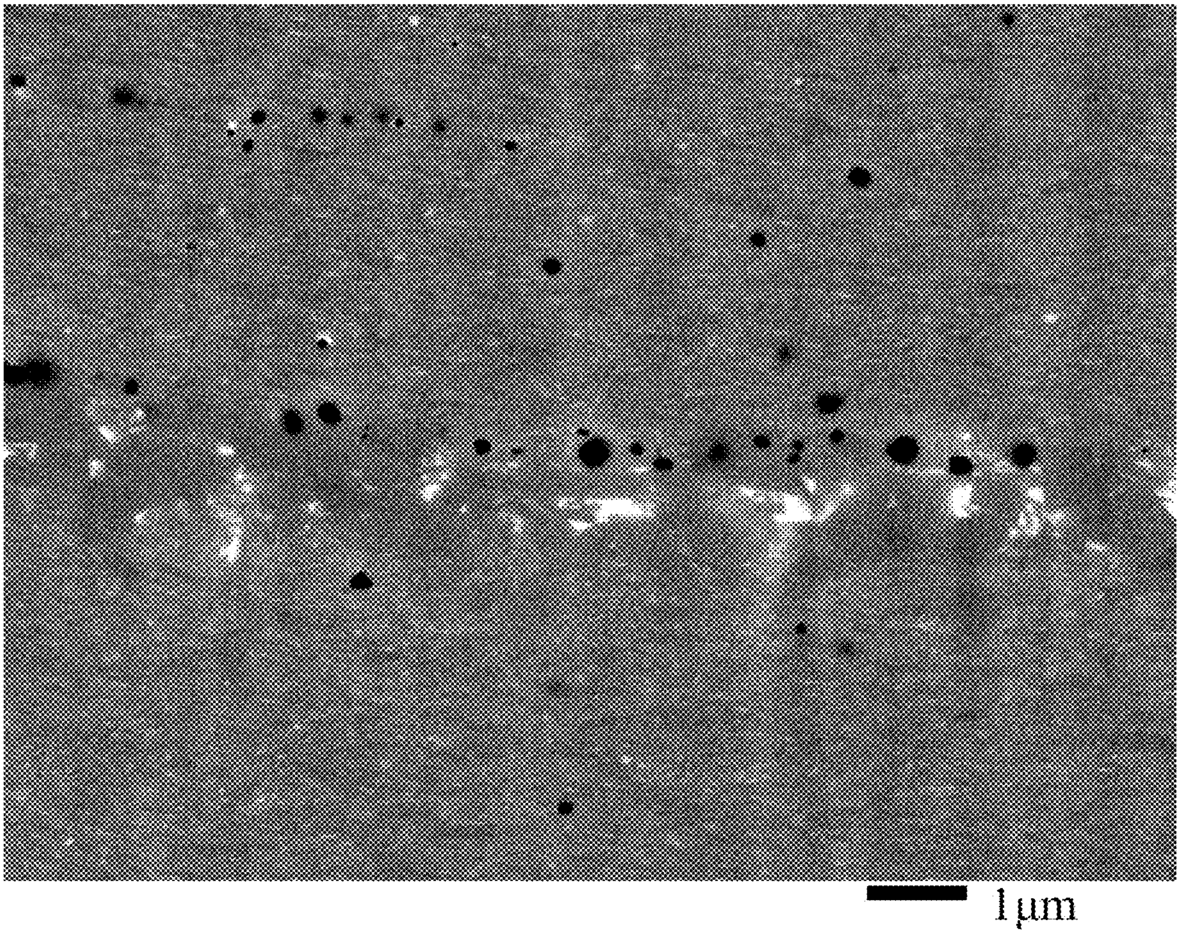
Figure 3C:
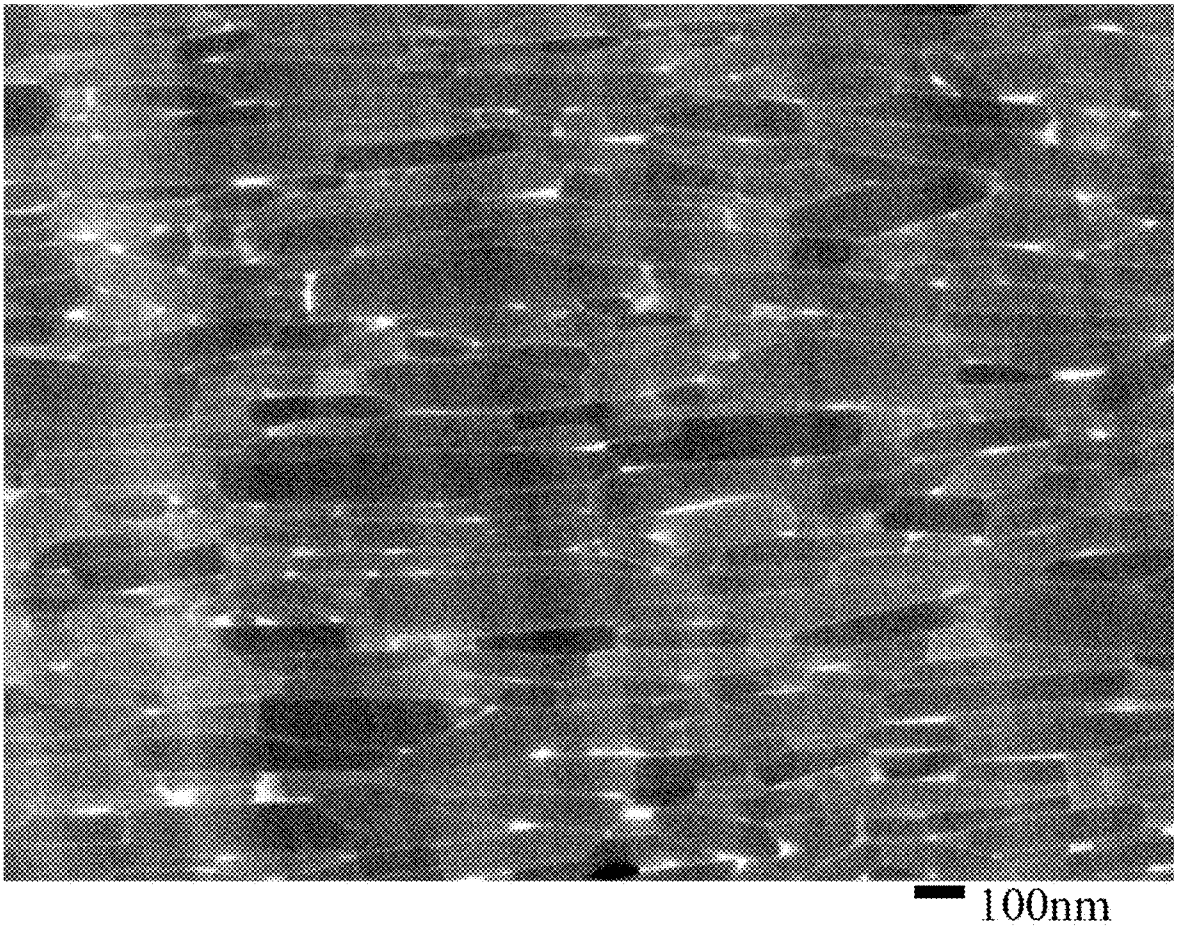

As shown in FIG. 3A, in the thermal deformation-based magnet with 0.5 wt. % of Ca—Cu alloy, the white Nd-rich phase enrichs at the magnetic powder interface decreased. As shown in FIG. 3B, there were coarse grains at some magnetic powder interfaces. The coarse grains are equiaxed crystals, and an average grain size of the equiaxed crystals is 512 nm. Statistics show that a volume fraction of the coarse-grained region is 8%, and a black particle phase of Ca—Cu alloy is distributed at the magnetic powder interface. As shown in FIG. 3C, the Nd—Fe—B matrix phase includes regularly arranged main phase $Nd_2Fe_{14}B$ flaky nanocrystallines and an Nd-rich phase around main phase grains. C-axes of the main phase $Nd_2Fe_{14}B$ flaky nanocrystallines (grain thickness direction) are arranged in parallel. The main phase $Nd_2Fe_{14}B$ flaky nanocrystallines have an average grain size in the length direction of 290 nm and an average grain size in the thickness direction of 95 nm, and the flaky nanocrystallines each have a length-to-thickness ratio of 3.05.

Figure 4A:
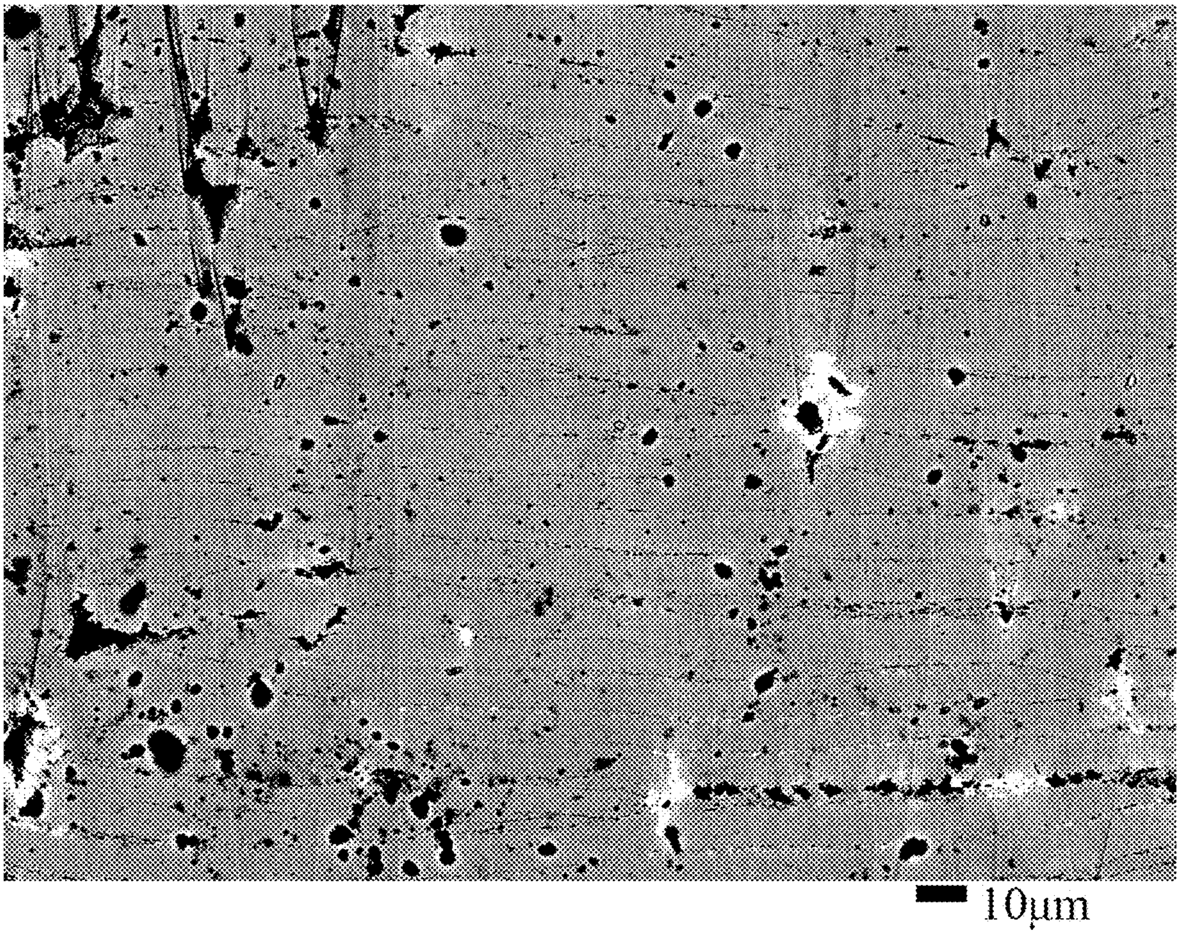
FIGS. 4A, 4B, and 4C show SEM images of cross-sections of anisotropic nanocrystalline rare earth permanent magnets prepared in Example 1 with 1.0 wt. % of Ca—Cu alloy powder.
Figure 4B:
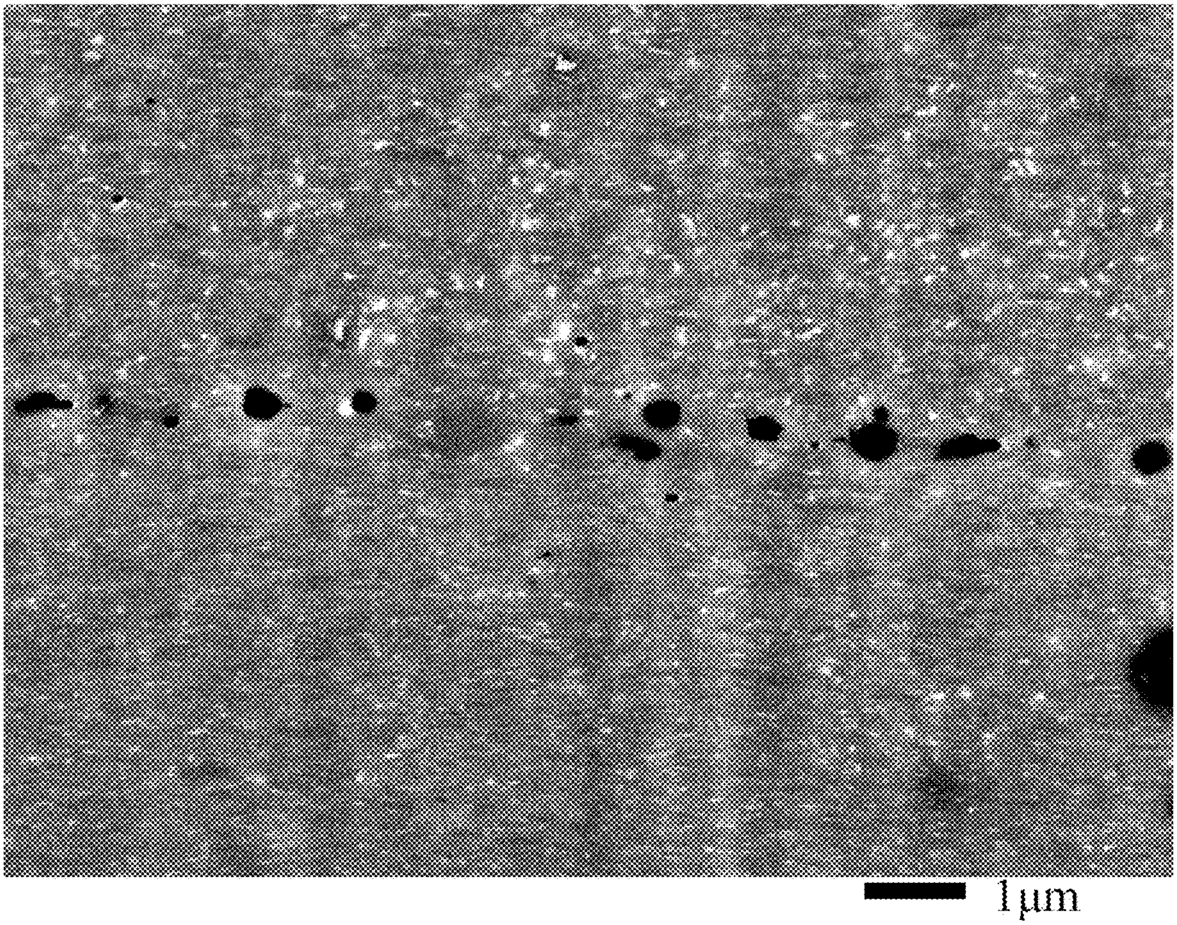
Figure 4C:
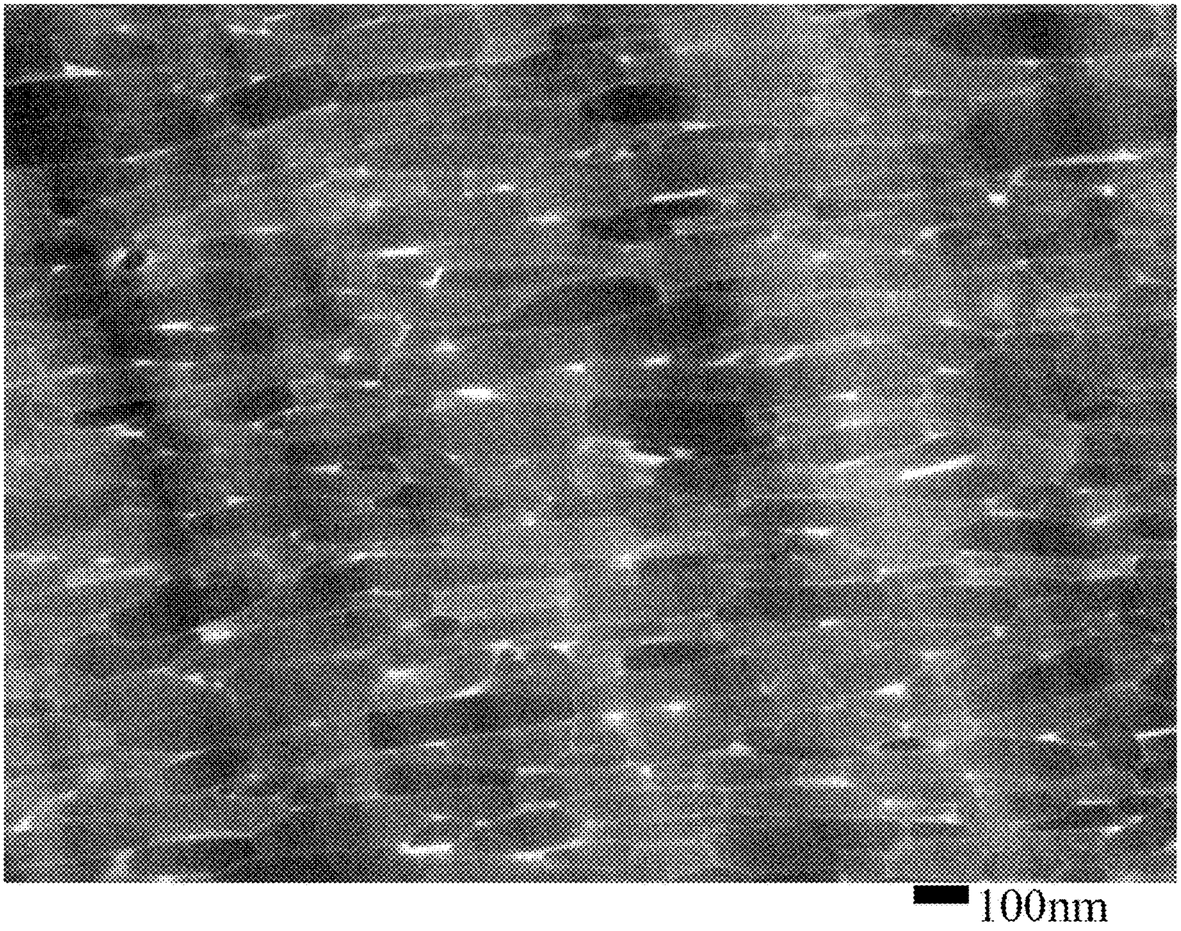

As shown in FIG. 4A, in the thermal deformation-based magnet with 1.0 wt. % of Ca—Cu alloy, there is only a small quantity of enriched white Nd-rich phase at the magnetic powder interface, and the Nd-rich phase at the magnetic powder interface is substantially completely suppressed, and the black particle phase of Ca—Cu alloy is distributed at the magnetic powder interface. As shown in FIG. 4B, the coarse grains at the magnetic powder interface are significantly reduced. Statistics show that the volume fraction of the coarse-grained region is not more than 1% and not less than 0.5%, indicating that the coarse grains of the thermal deformation-based magnet are substantially completely suppressed and the coarse-grained region substantially disappears. As shown in FIG. 4C, the Nd—Fe—B matrix phase includes regularly arranged main phase $Nd_2Fe_{14}B$ flaky nanocrystallines and an Nd-rich phase around main phase grains. C-axes (grain thickness direction) of the main phase $Nd_2Fe_{14}B$ flaky nanocrystallines are arranged in parallel. The main phase $Nd_2Fe_{14}B$ flaky nanocrystallines have an average grain size in the length direction of 280 nm and an average grain size in the thickness direction of 80 nm, and the flaky nanocrystallines each have a length-to-thickness ratio of 3.5.

Figure 5A:
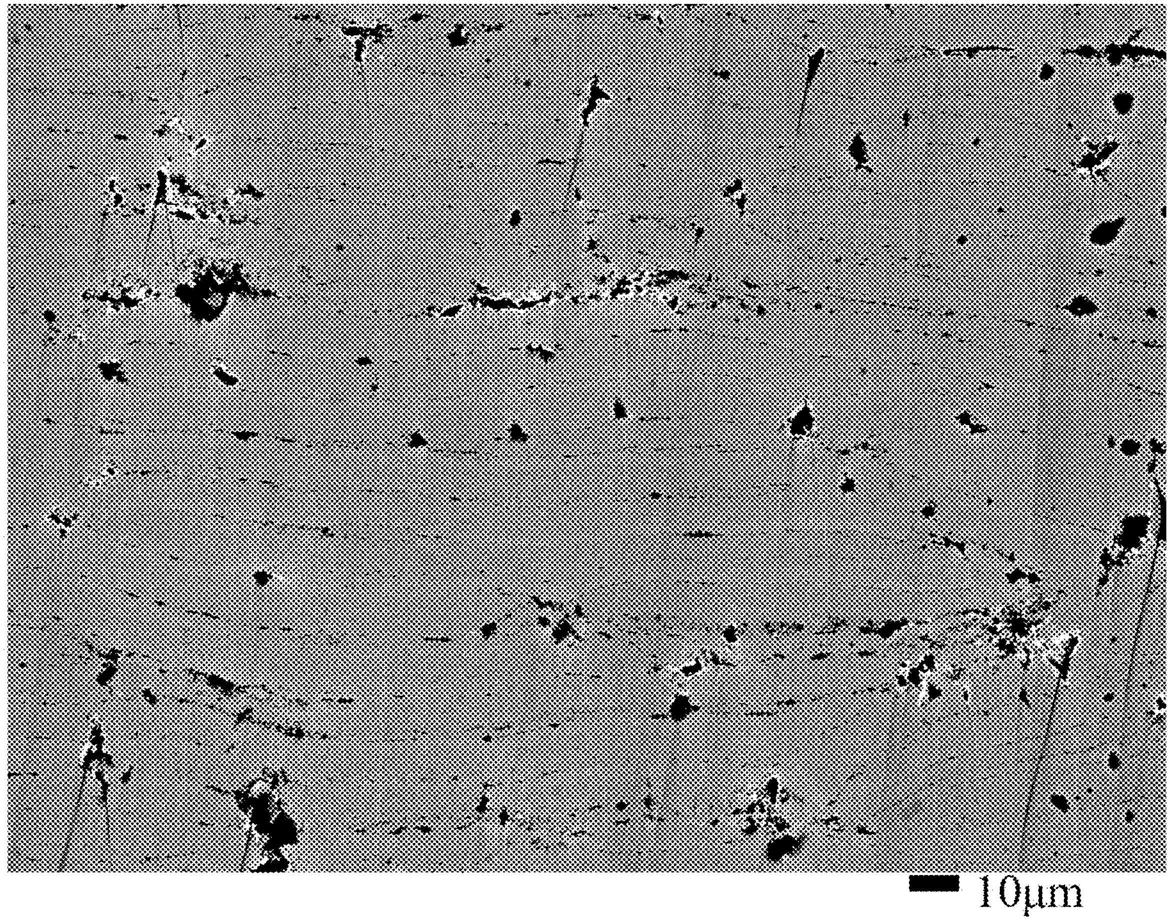
FIGS. 5A, 5B, and 5C show SEM images of cross-sections of anisotropic nanocrystalline rare earth permanent magnets prepared in Example 1 with 2.0 wt. % of Ca—Cu alloy powder.
Figure 5B:
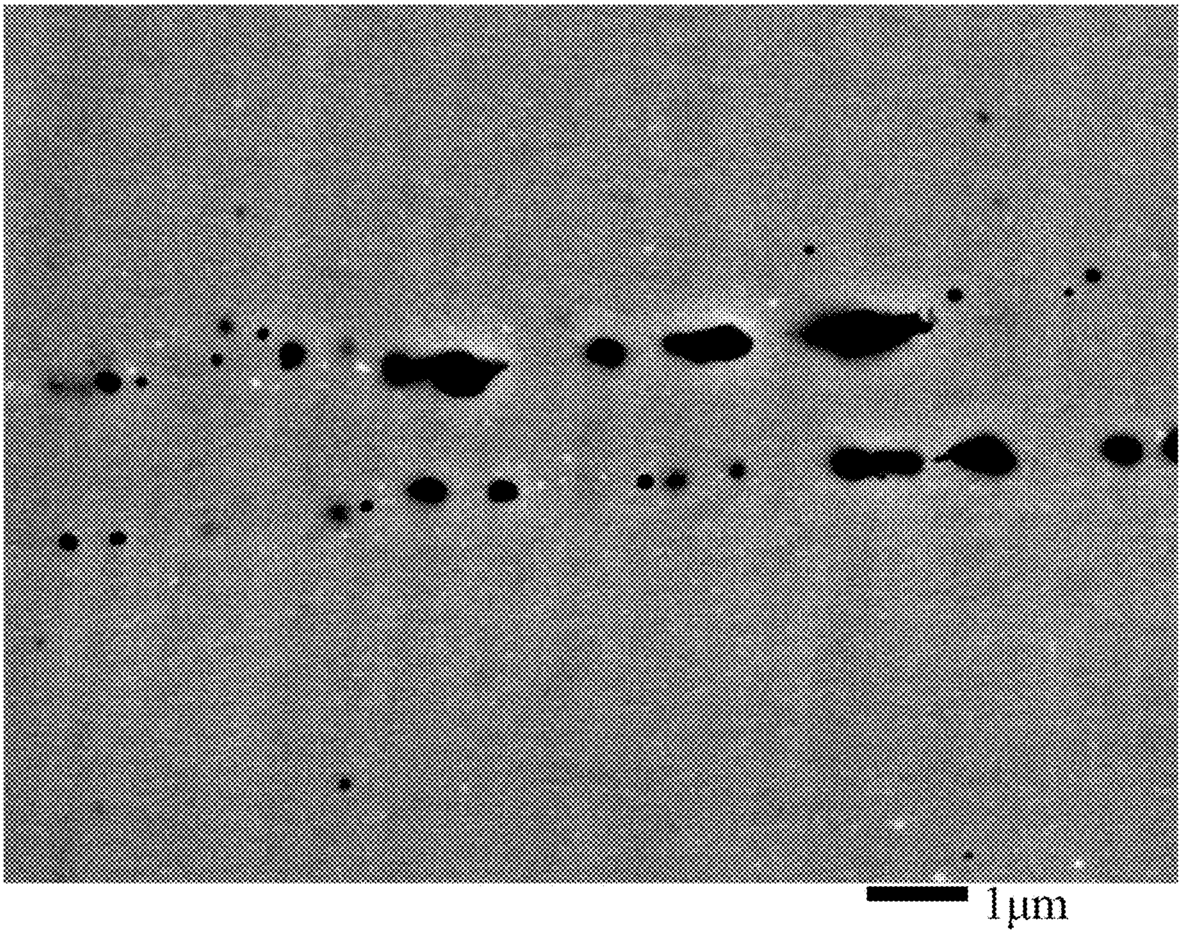
Figure 5C:
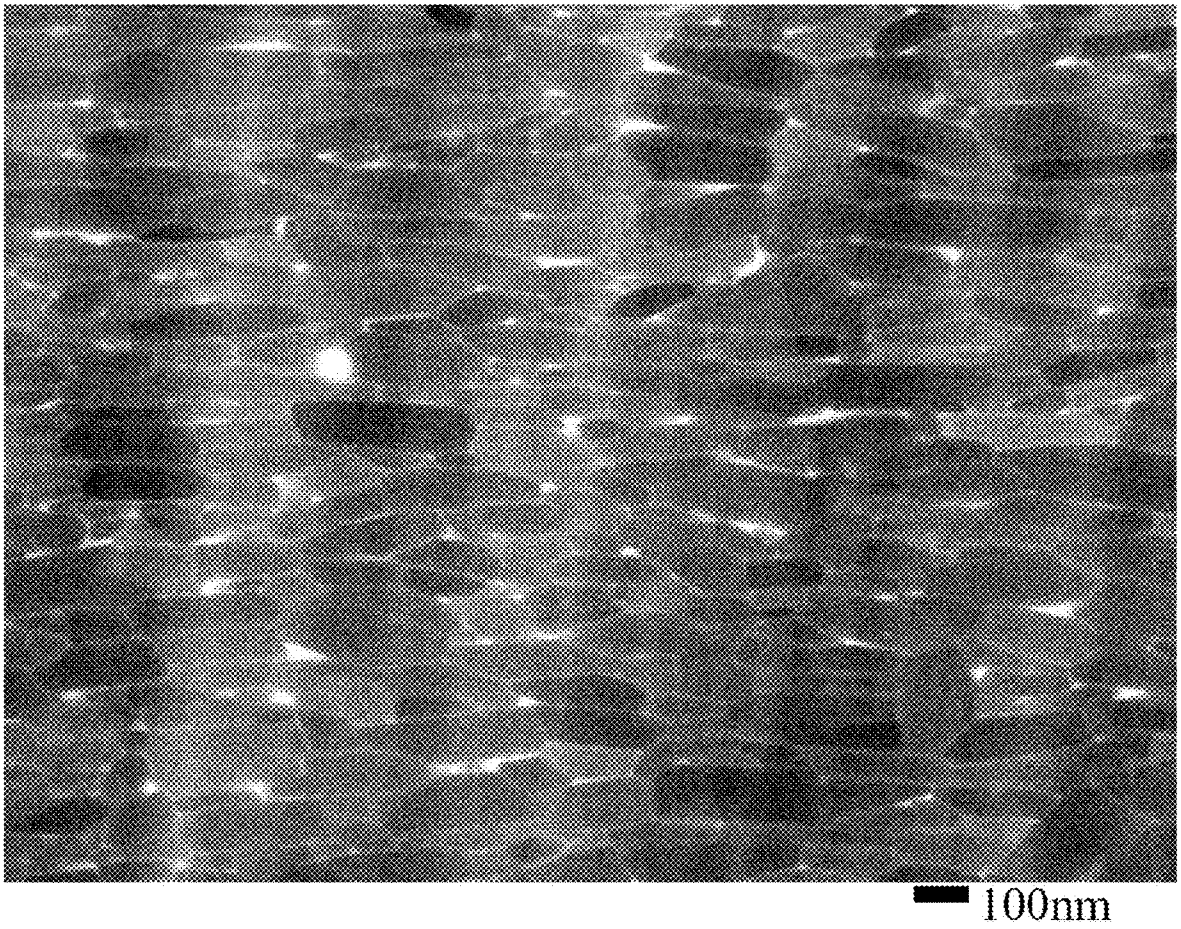
Figure 6A:
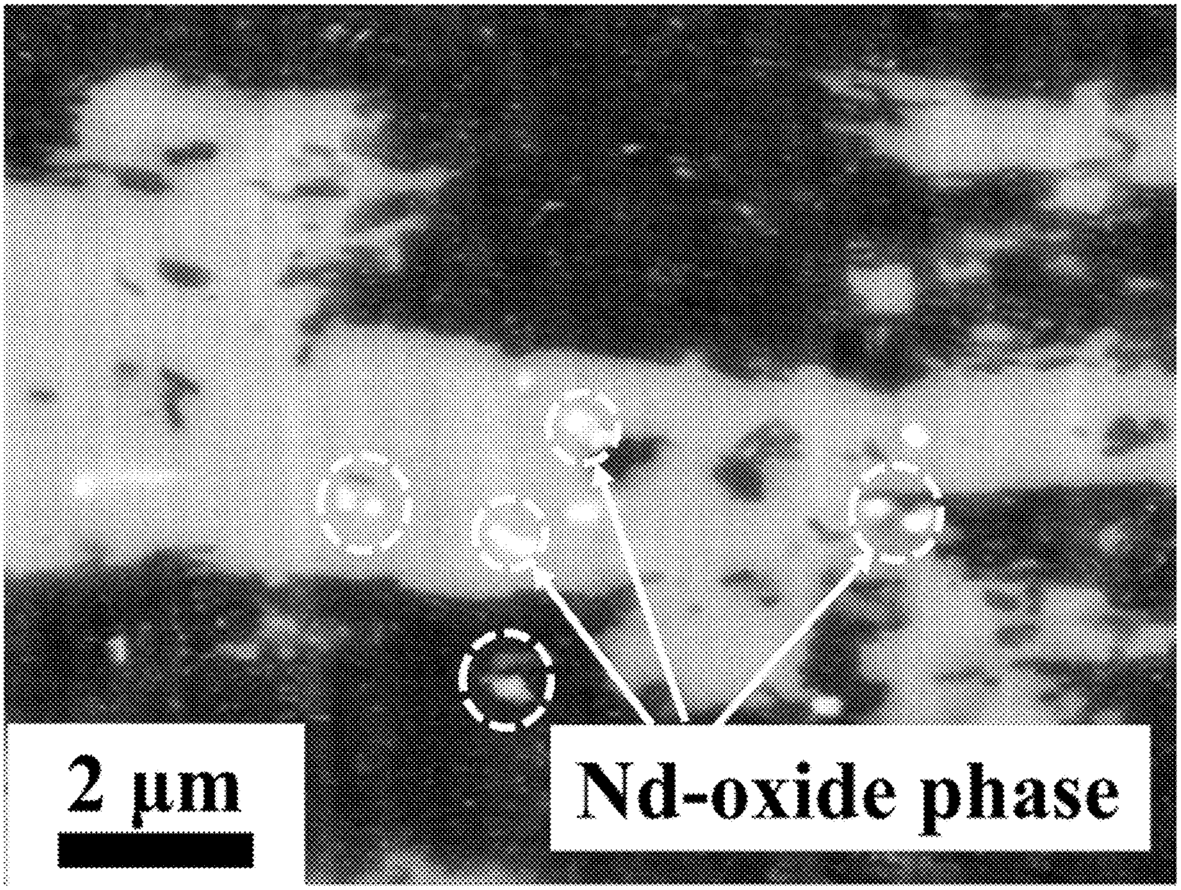
FIGS. 6A, 6B, 6C, 6D, and 6E show SEM-energy dispersive spectroscopy (EDS) spectra at an interface of the magnetic powder inside the anisotropic nanocrystalline rare earth permanent magnet prepared in Comparative Example 1.
Figure 6B:
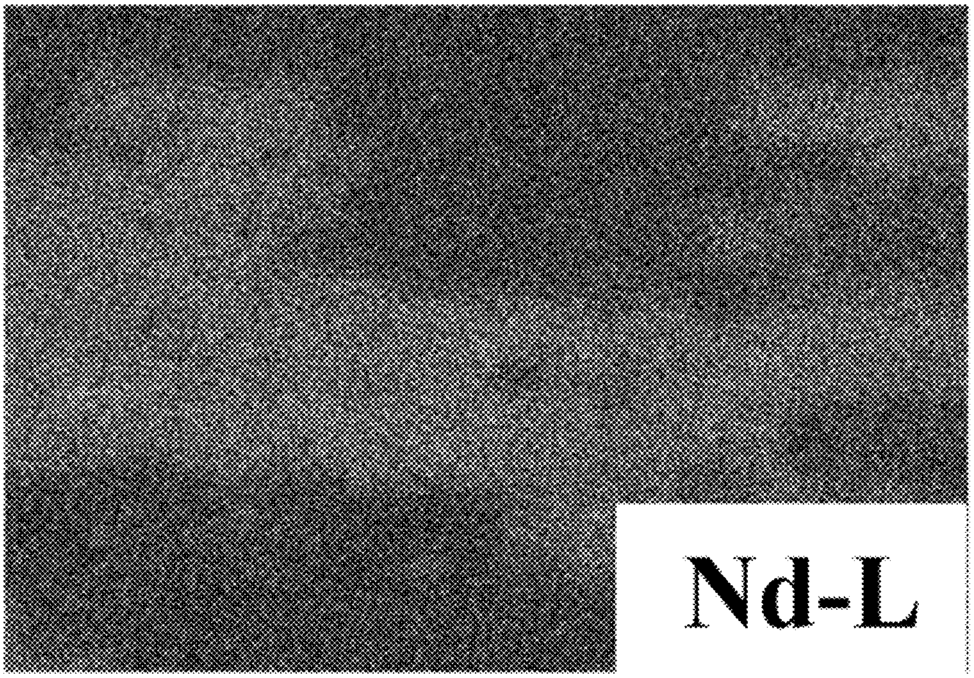
Figure 6C:
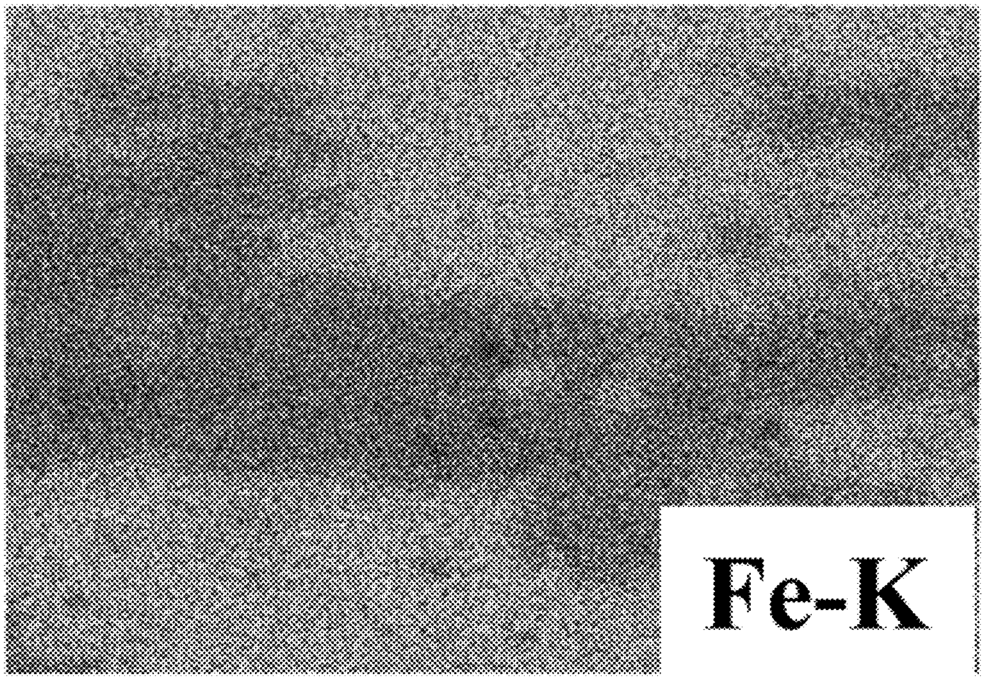
Figure 6D:
Figure 6E:
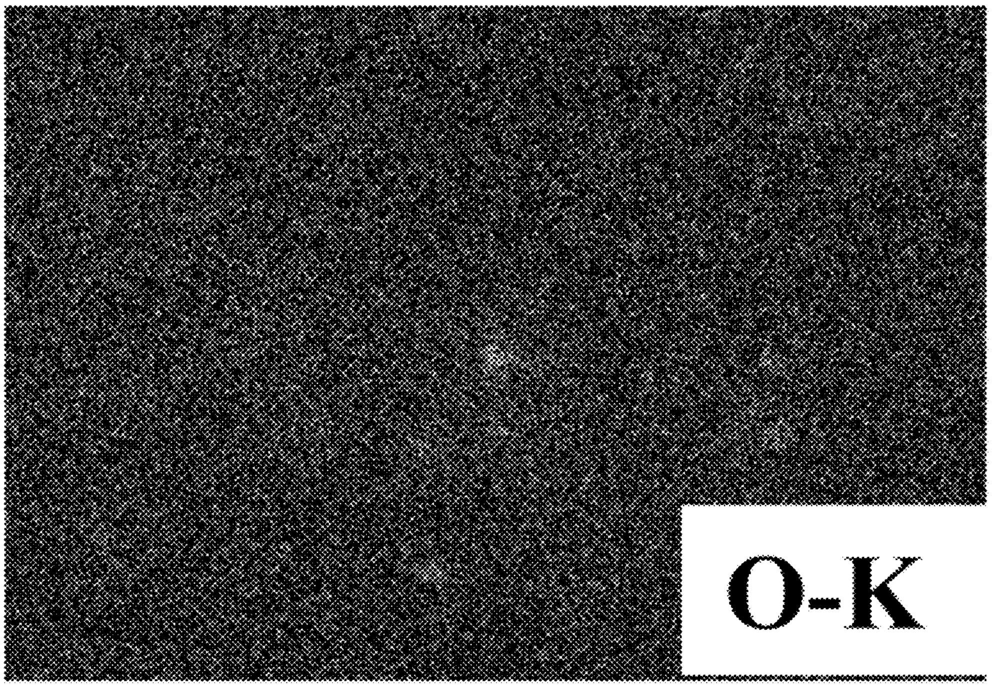
Figure 6F:
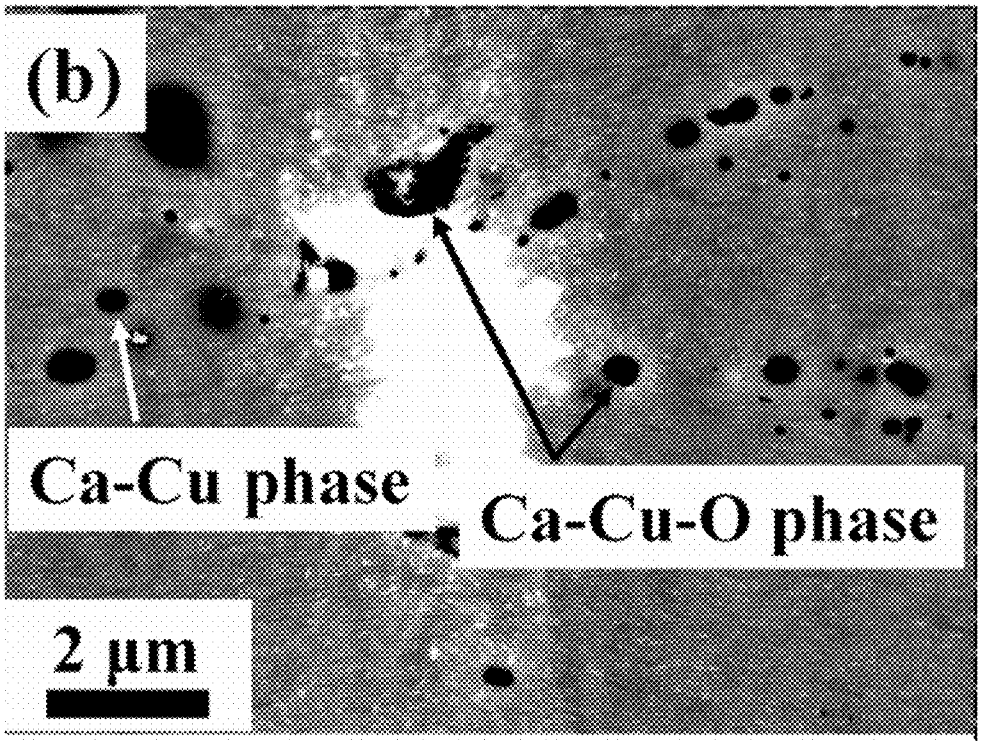
FIGS. 6F, 6G, 6H, 6I, 6J, 6K, and 6L show SEM-EDS spectra at an interface of the magnetic powder inside the anisotropic nanocrystalline rare earth permanent magnet prepared by adding 1.0 wt. % of Ca—Cu alloy powder in Example 1.
Figure 6G:
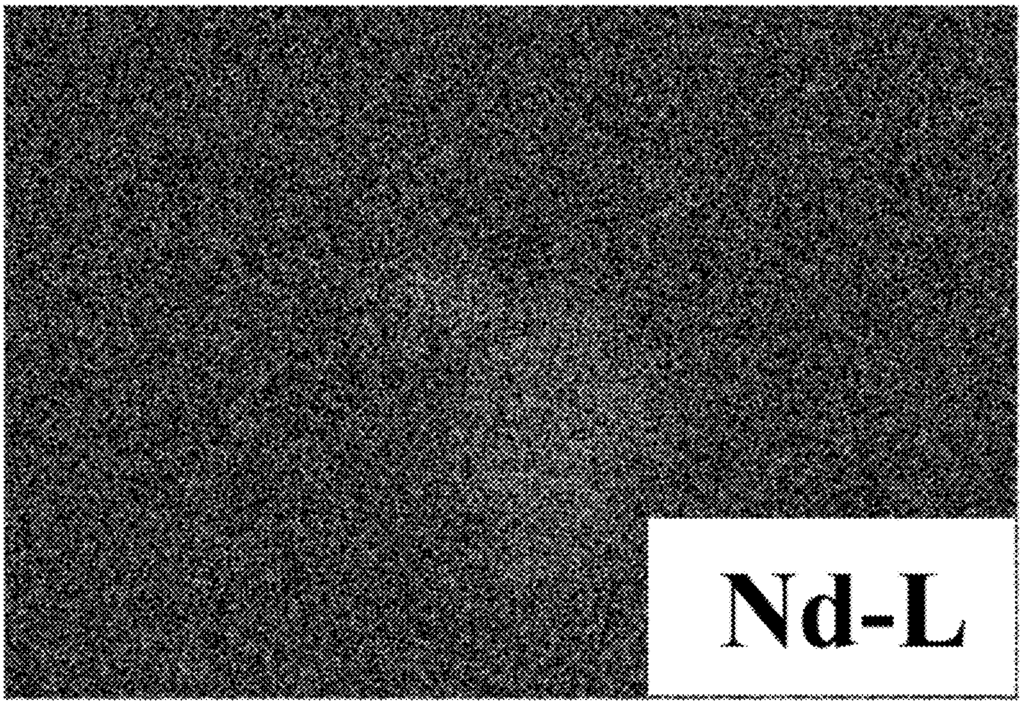
Figure 6H:
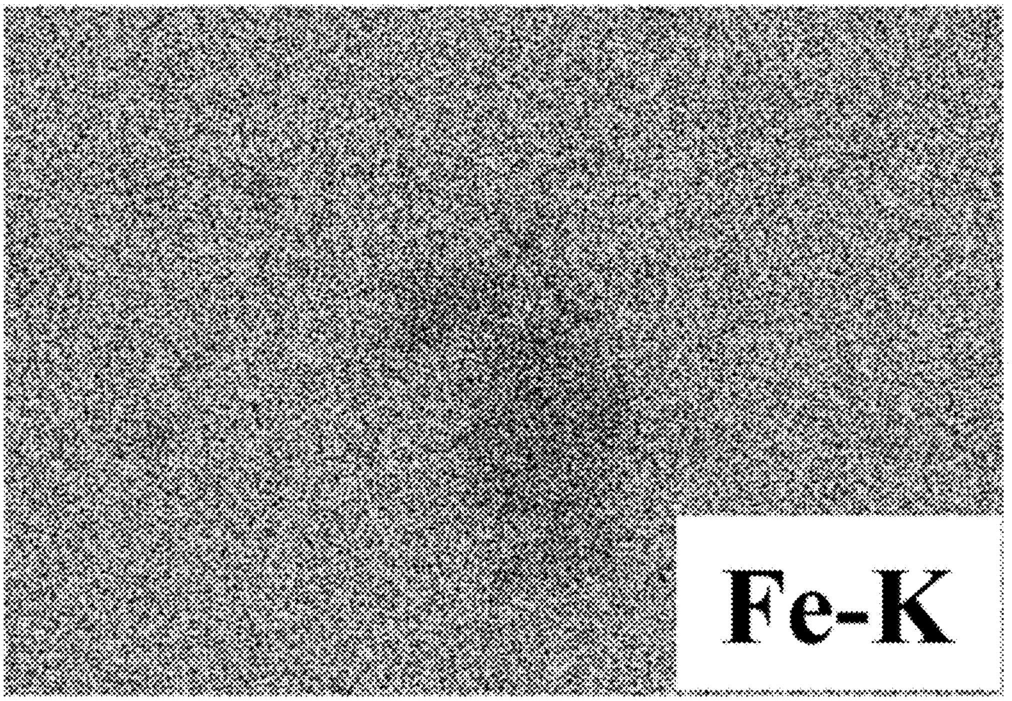
Figure 6I:
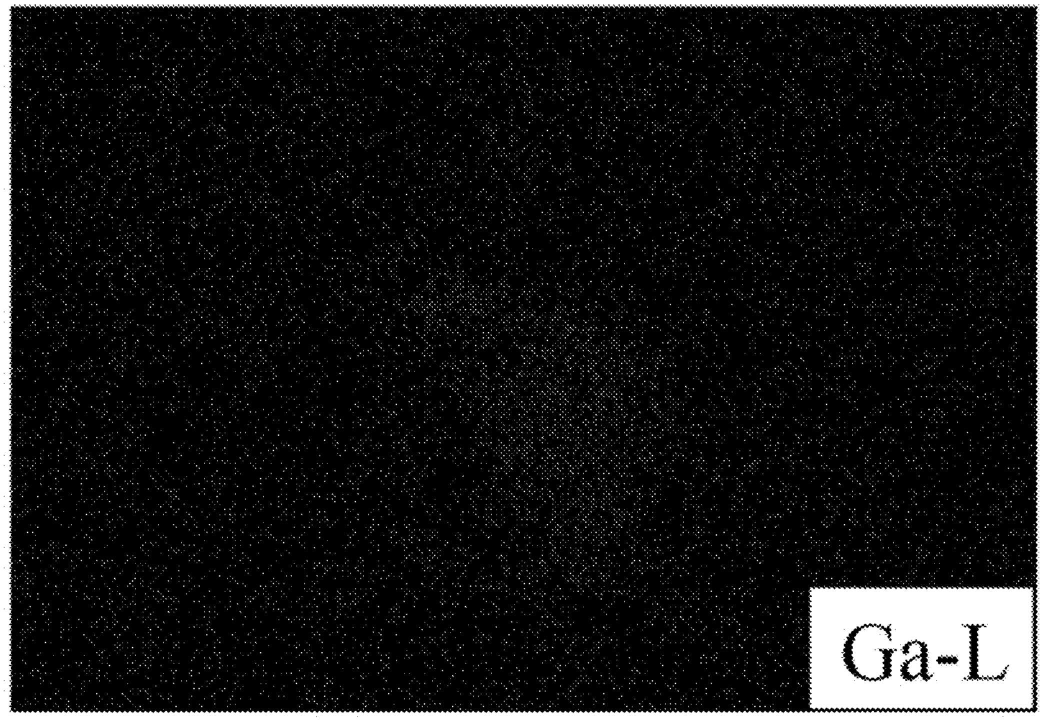
Figure 6J:
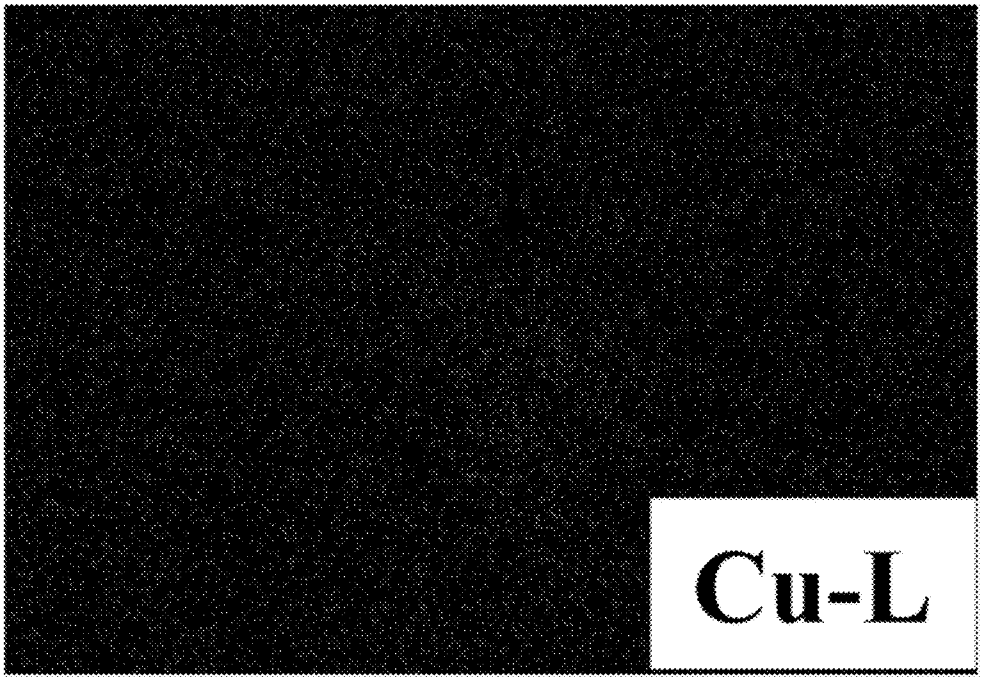
Figure 6K:
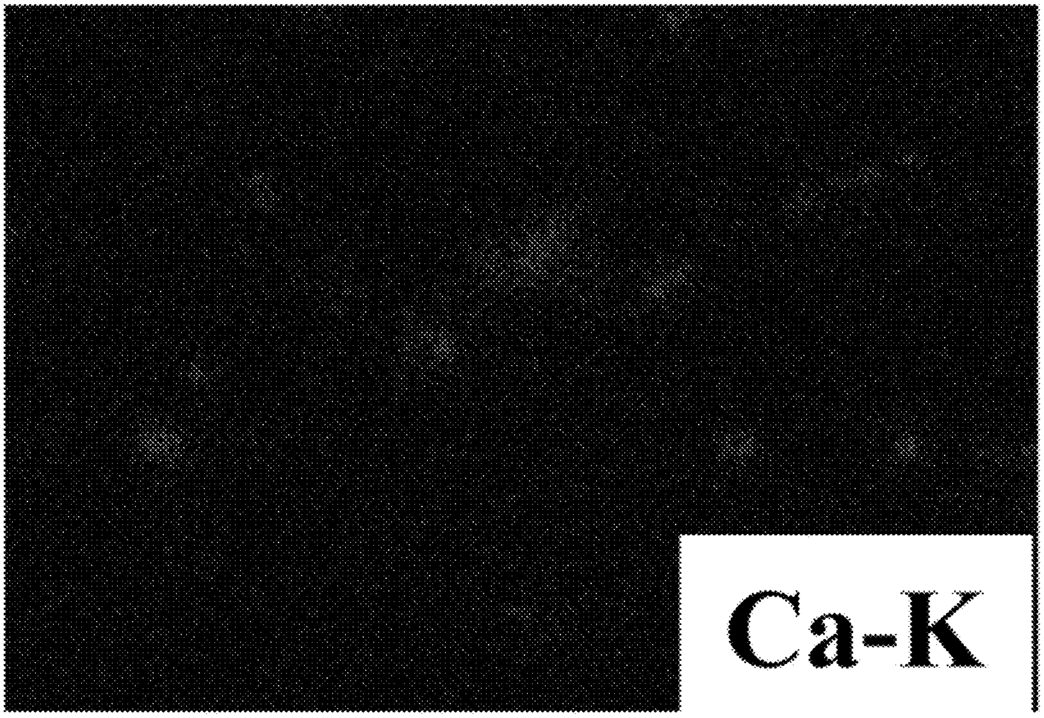
Figure 6L:
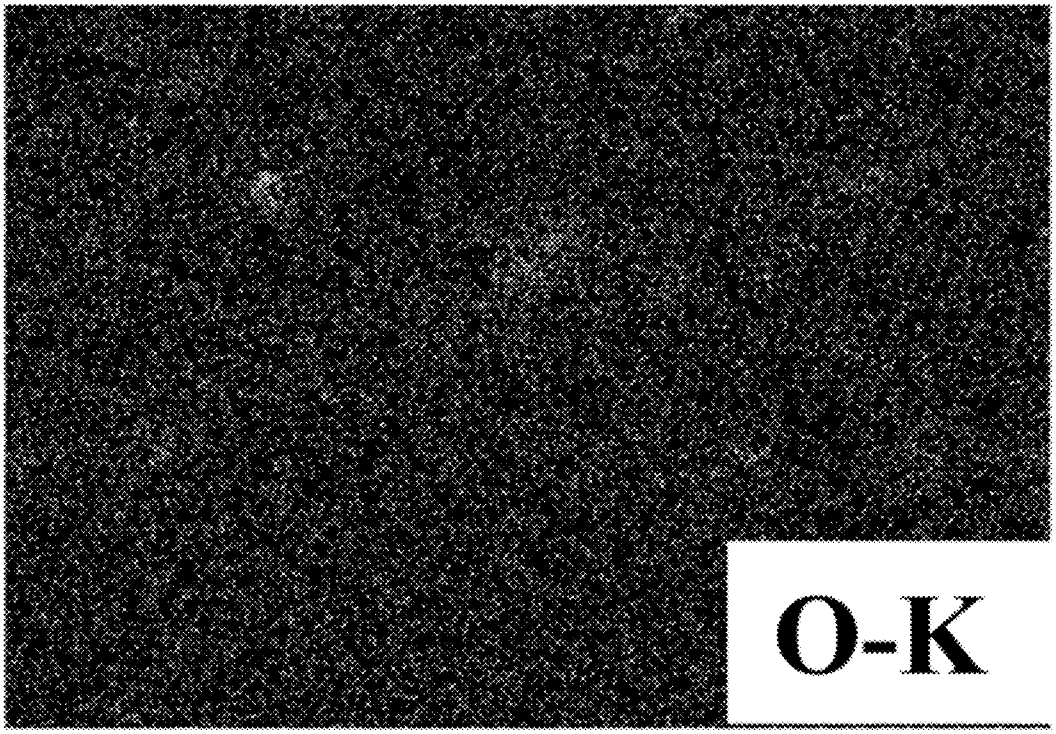

As shown in FIG. 5A, in the thermal deformation-based magnet with 2.0 wt. % of Ca—Cu alloy, the black particle phase is enriched at the magnetic powder interface, while there is no enriched white Nd-rich phase at the magnetic powder interface. As shown in FIG. 5B, further increase in the Ca—Cu alloy content leads to the agglomeration of Ca—Cu alloy particles at the magnetic powder interface inside the magnet, resulting in uneven microstructure inside the magnet and decreased magnetic properties of the magnet. Statistics show that a volume fraction of the coarse-grained region is not more than 1%. As shown in FIG. 5C, the Nd—Fe—B matrix phase includes regularly arranged main phase $Nd_2Fe_{14}B$ flaky nanocrystallines and a Nd-rich phase around main phase grains. C-axes (grain thickness direction) of the main phase $Nd_2Fe_{14}B$ flaky nanocrystallines are arranged in parallel. The main phase $Nd_2Fe_{14}B$ flaky nanocrystallines have an average grain size in the length direction of 281 nm and an average grain size in the thickness direction of 79 nm, and the flaky nanocrystallines each have a length-to-thickness ratio of 3.56.

Combining the above analysis, it can be seen that: on one hand, an appropriate amount of Ca—Cu alloy added to the anisotropic nanocrystalline rare earth permanent magnet could inhibit the formation of coarse grains at the magnet interface: on the other hand, the Ca—Cu alloy could also refine the grains of the main phase $RE_2Fe_{14}B$ flaky nanocrystallines. In addition, the Ca—Cu alloy could inhibit the enrichment of the Nd-rich phase at the magnetic powder interface, increase the content of the Nd-rich phase between the main phase grains inside the magnet, enhance the pinning effect of the grain boundaries on the magnetic domain walls, and improve the coercive force of the magnet.

Figure 7A:
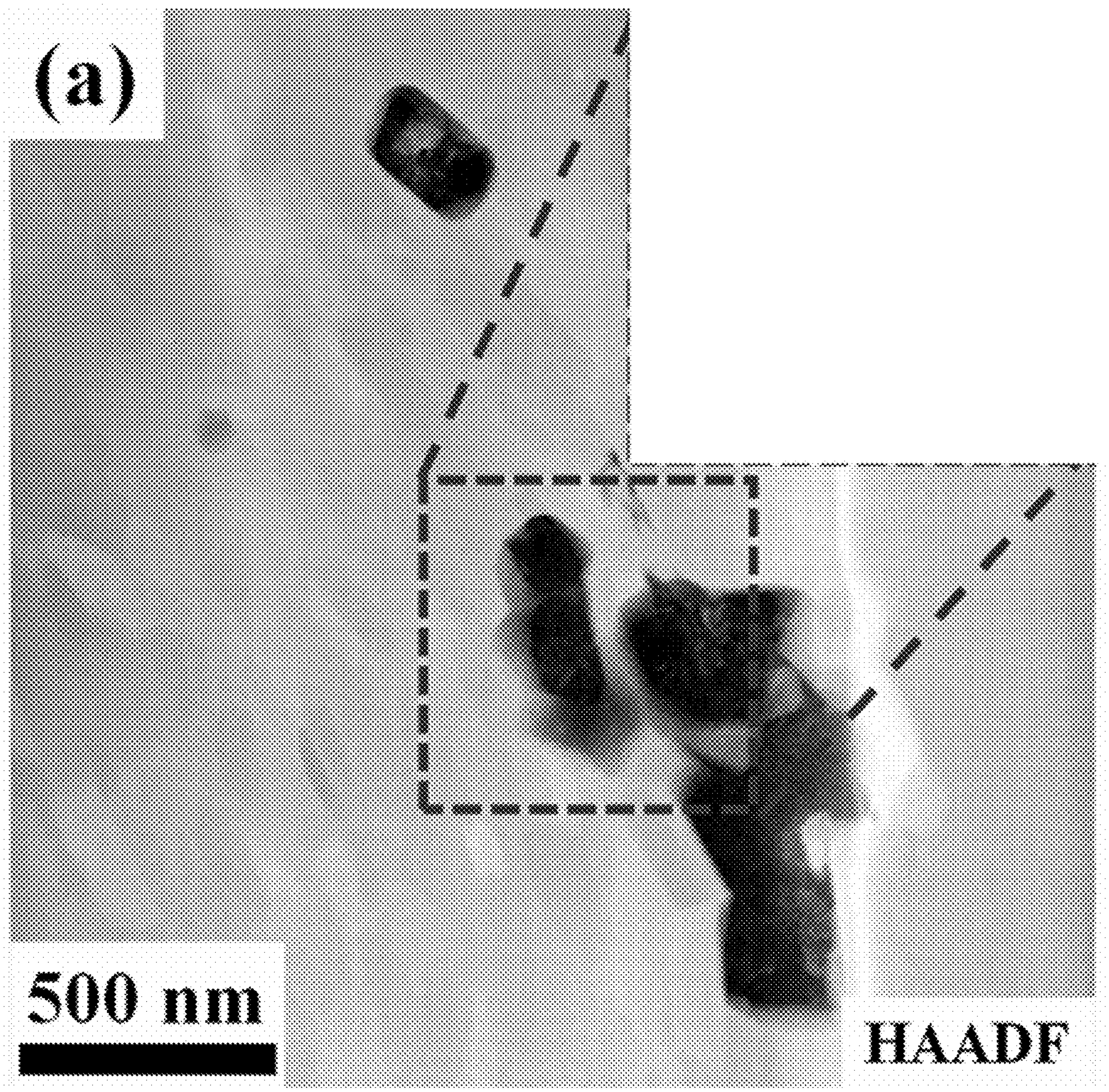
FIGS. 7A, 7B, 7C, 7D, 7E, and 7F show transmission electron microscope (TEM)-EDS spectra of the Ca—Cu—O phase region at an interface of the magnetic powder inside the anisotropic nanocrystalline rare earth permanent magnet prepared by adding 1.0 wt. % of Ca—Cu alloy powder in Example 1.
Figure 7B:
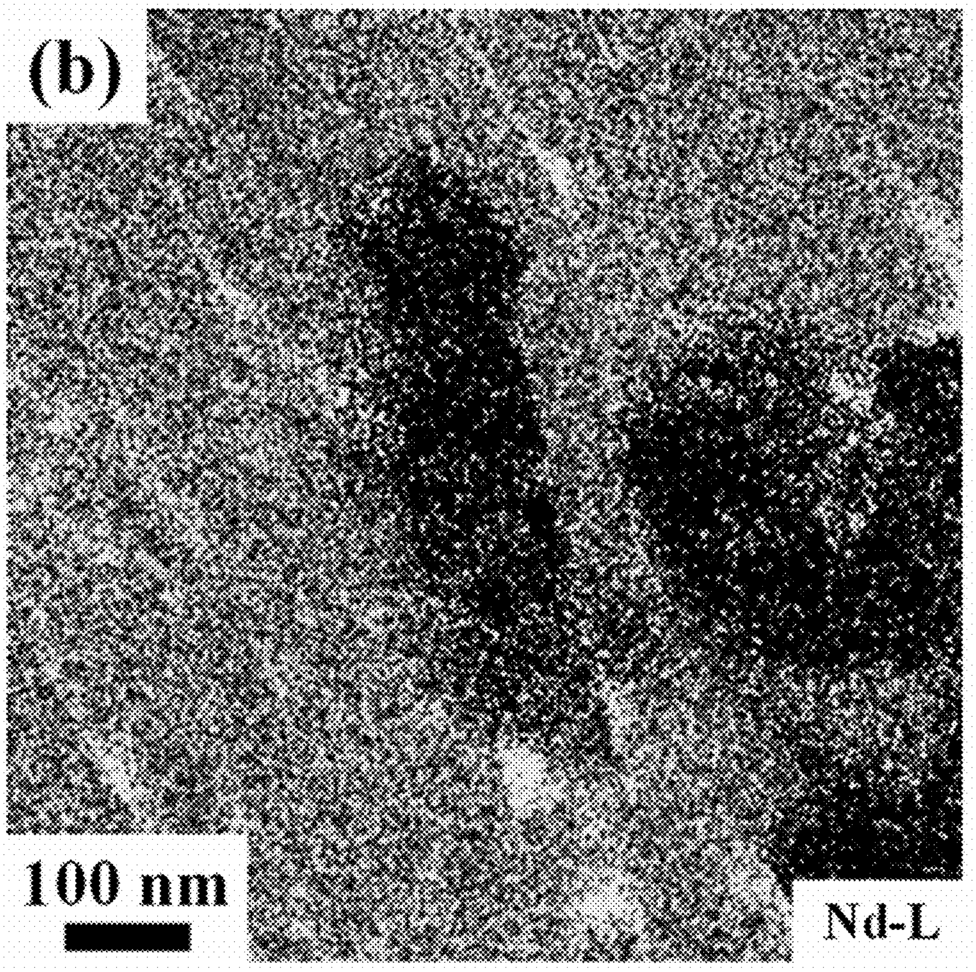
Figure 7C:
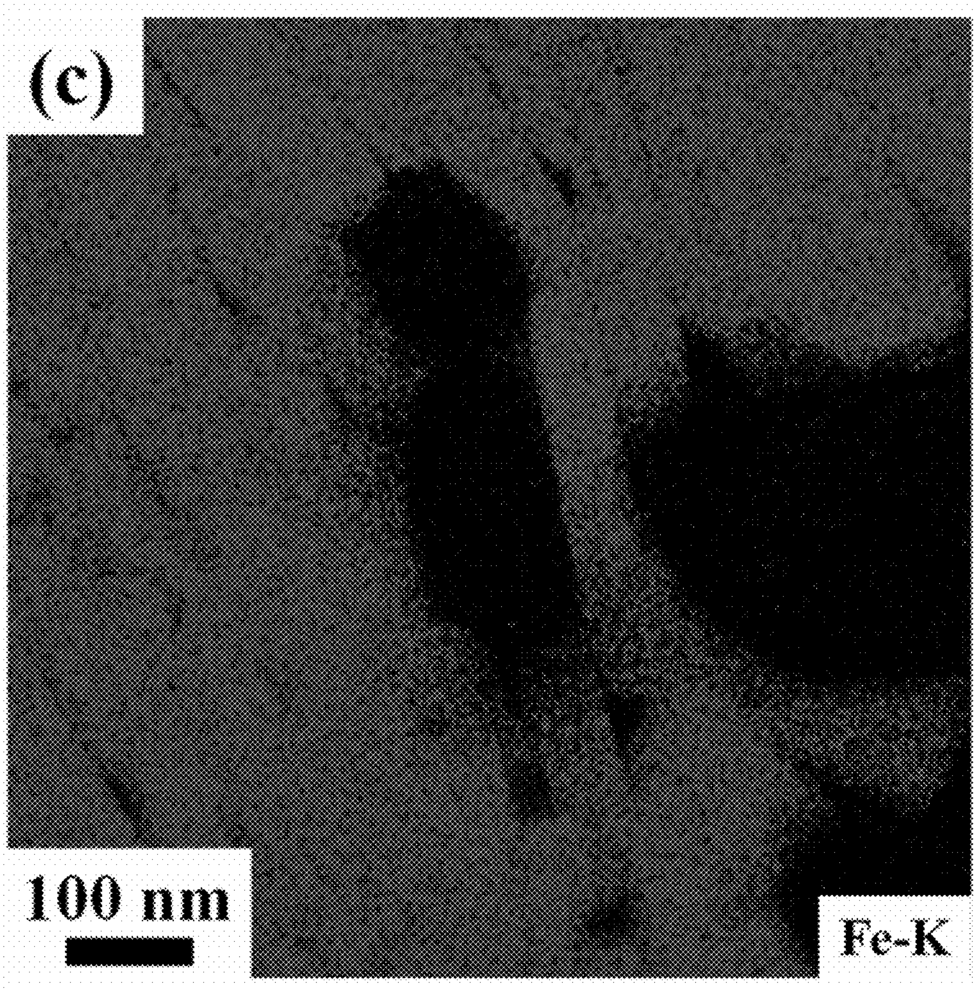
Figure 7D:
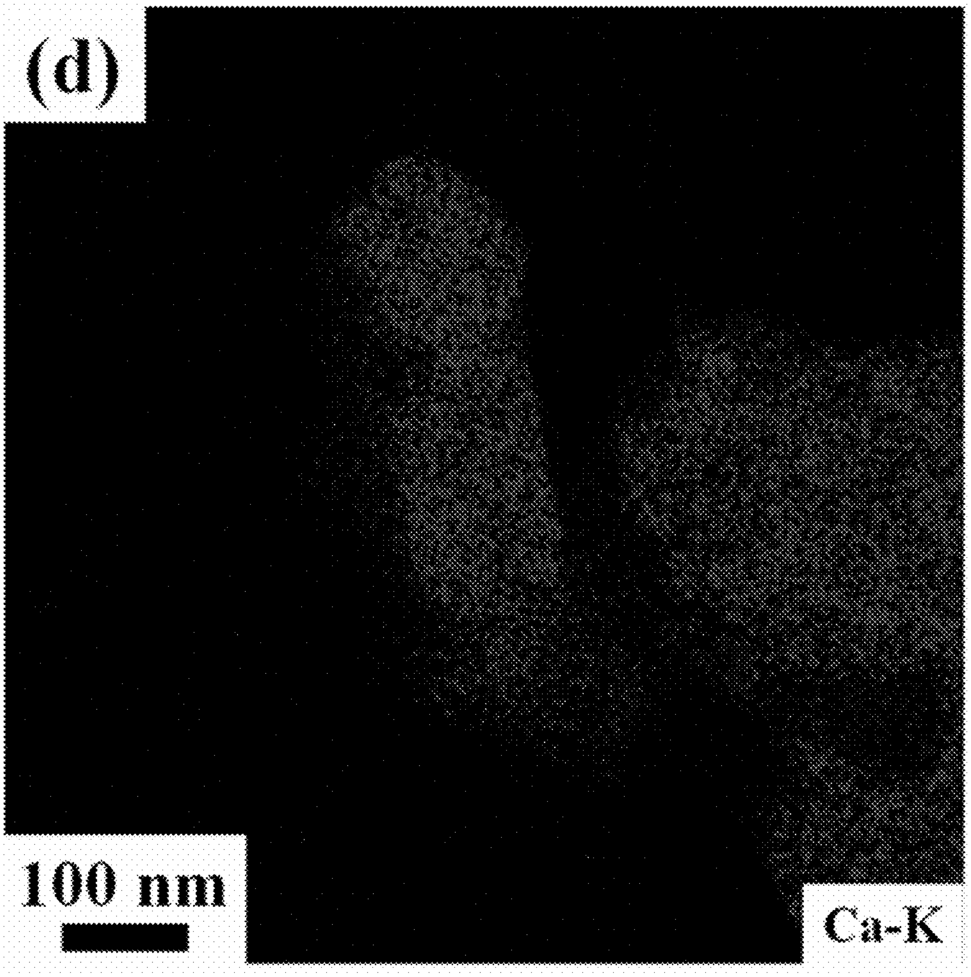
Figure 7E:
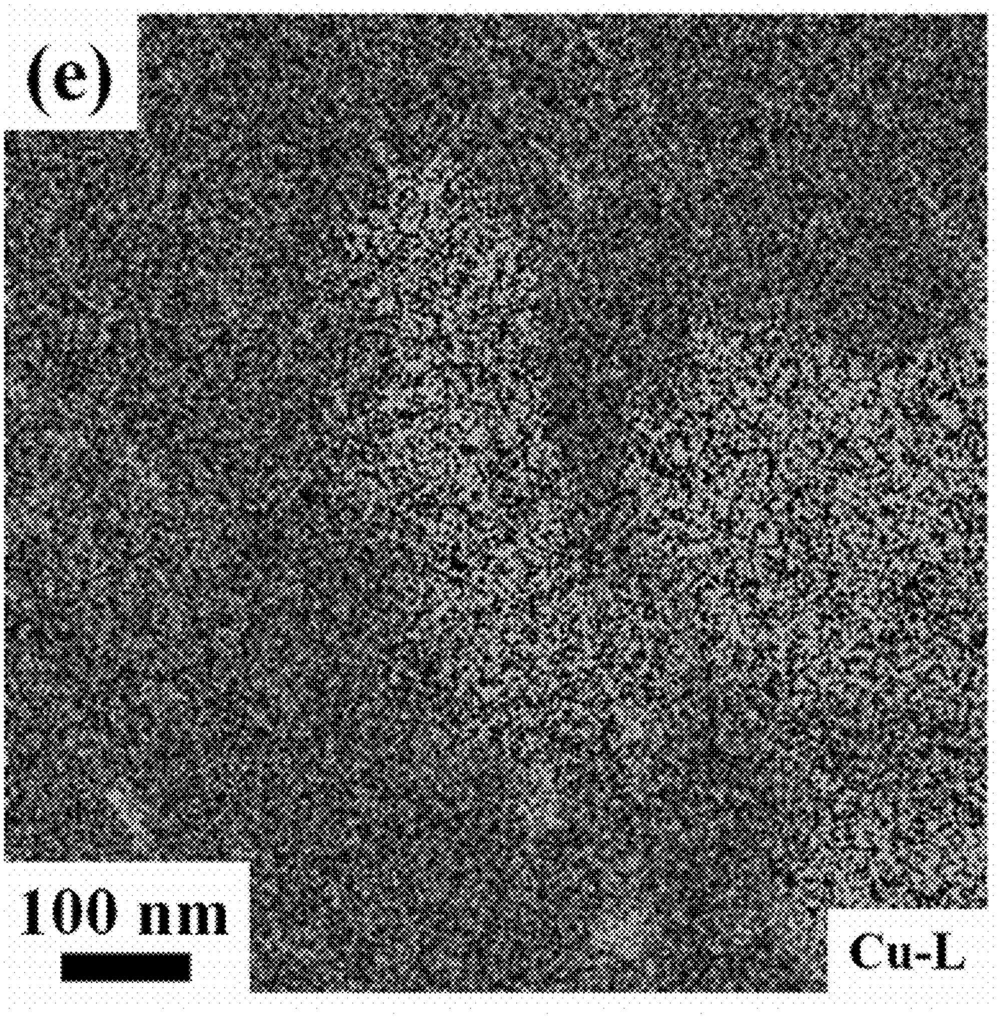
Figure 7F:
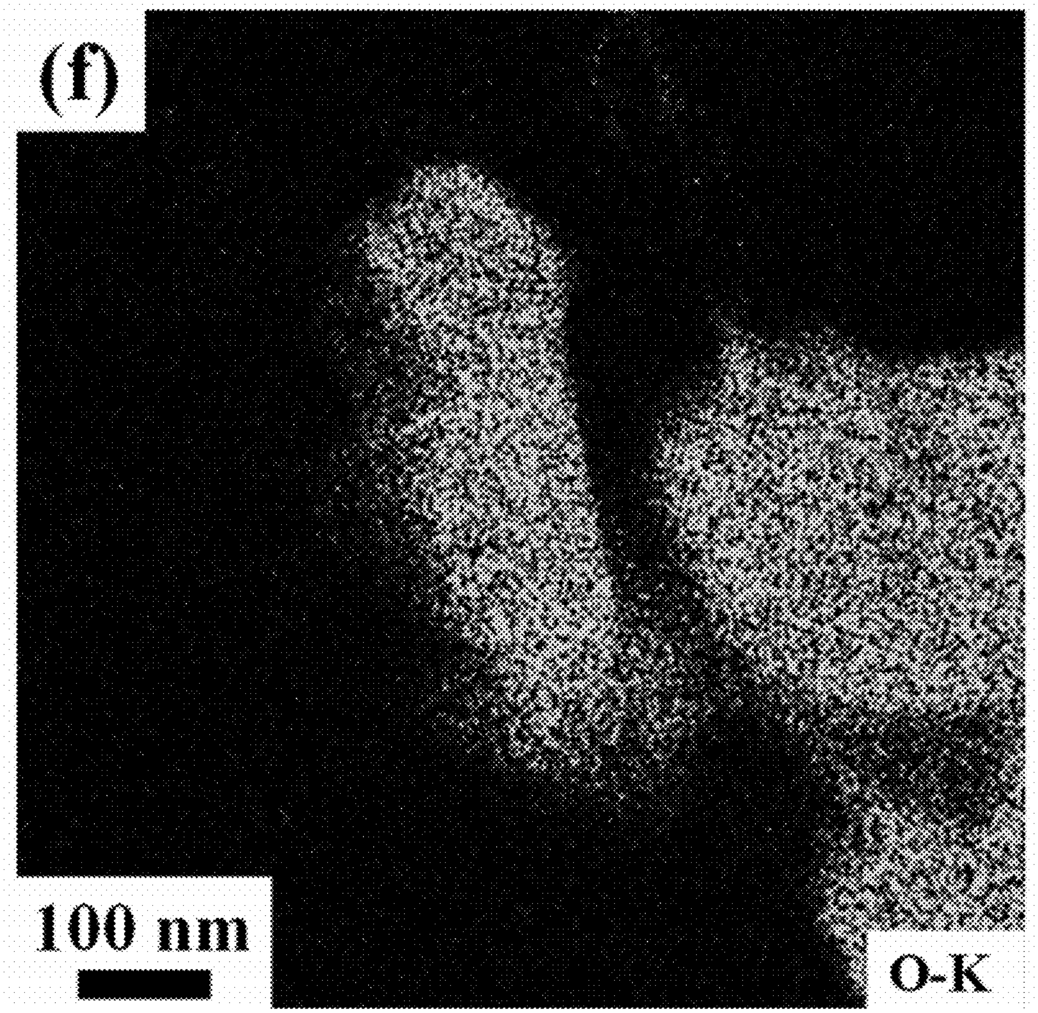

Further, as shown in FIG. 6A to FIG. 6E, in the thermal deformation-based magnet without adding Ca—Cu alloy in Comparative Example 1, there is a large quantity of granular rare earth oxide Nd—O phase in the Nd-rich phase at the magnetic powder interface inside the magnet. As shown in FIG. 6F to FIG. 6L, in the thermal deformation-based magnet with 1.0 wt. % of Ca—Cu alloy in Example 1, the rare earth oxide Nd—O phase at the magnetic powder interface reacts with part of the Ca—Cu alloy to form a Ca—Cu—O phase, which could be further confirmed by the TEM-EDS spectrum of the thermal deformation-based magnet. Combined with FIG. 7A to FIG. 7F, the EDS element mapping of the particle phase in the framed area in FIG. 7A is shown in FIG. 7B to FIG. 7F, indicating that the particle phase in the framed area is composed of three elements: Ca, Cu, and O. The unreacted Ca—Cu alloy remains as the Ca—Cu phase in the thermal deformation-based magnet, indicating that the Ca—Cu alloy does not react with the main phase $Nd_2Fe_{14}B$. FIG. 7A, FIG. 7B, and FIG. 7C also intuitively show the main phase $Nd_2Fe_{14}B$ flaky nanocrystallines and the grain boundary Nd-rich phase, and the grain boundary Nd-rich phase is continuously distributed in the grain boundaries to improve the pinning effect. Therefore, the coercive force of the thermal deformation-based magnet was significantly improved.

Compared with the thermal deformation-based magnet of Example 1 with 1.0 wt. % of $Ca_{70}Cu_{30}$ alloy, the thermal deformation-based magnet of Comparative Example 2 with 1.0 wt. % of $Al_{70}Cu_{30}$ alloy, a residual magnetism of the thermal deformation-based magnet prepared in Comparative Example 2 is significantly reduced, and there is a slight coercive force increase. This was mainly due to the fact that there are more coarse grains at the magnetic powder interface of the thermal deformation-based magnet, and statistics show that the volume fraction of the coarse-grained region is 12%. Although Al and Cu elements could improve the grain boundary composition of nanocrystalline magnets through diffusion, the coarse-grained region at the interface of nanocrystalline magnets is not effectively suppressed, resulting in a significant reduction in residual magnetism and a low coercive force increase of the magnet.

Example 2

This example provided an anisotropic nanocrystalline rare earth permanent magnet and a preparation method thereof, and the preparation method was as follows:

S1. An alloy ingot with a chemical formula of $Nd_{29.39}Ce_{0.5}Fe_{62.76}Co_{5.93}\,Ga_{0.5}B_{0.92}$ (wt. %) was subjected to melt-spinning at a linear speed of a fast quenching roller of 35 m/s, to obtain an amorphous rapidly-quenched magnetic powder with a particle size of 50 μm to 450 μm, and the amorphous rapidly-quenched magnetic powder was an isotropic magnetic powder. An alloy ingot with a chemical formula of $Ca_{65}Cu_{35}$ (wt. %) was mechanically crushed to obtain an alloy powder with an average particle size of 100 μm. The $Ca_{65}Cu_{35}$ alloy powder and the amorphous rapidly-quenched magnetic powder were mixed three-dimensionally for 2 h under a protective atmosphere of argon to obtain a raw material powder, wherein the raw material powder was an isotropic raw material powder. In the prepared raw material powder, the $Ca_{65}Cu_{35}$ alloy powder was added in an amount of 1.0 wt. % of the amorphous rapidly-quenched magnetic powder.

S2. The raw material powder prepared in S1 was subjected to thermal processing, specifically as follows:

S2.1, the raw material powder was prepared into a hot-pressed green body having a diameter of 30 mm under a vacuum degree of $1\times10^{-2}$ Pa at a temperature of 680° C. and a pressure of 200 MPa, with a density of 99%; and S2.2, the hot-pressed green body was subjected to thermal extrusion deformation at 750° C. at a thermal extrusion rate of 0.1 mm/s under a vacuum degree of $1\times10^{-2}$ Pa, to obtain an anisotropic nanocrystalline magnetic ring with a wall thickness of 2 mm and an outer diameter of 30 mm.

Comparative Example 3

Comparative Example 3 was different from Example 2 in that the $Ca_{65}Cu_{35}$ alloy powder was not added in Comparative Example 3, while the remaining preparation steps were the same as those in Example 2. Table 2 shows the magnetic properties of the anisotropic nanocrystalline magnetic rings prepared in Example 2 and Comparative Example 3.

TABLE 2

Magnetic properties of anisotropic nanocrystalline magnetic ring

| | $B_r$ (kGs) | $H_{cj}$ (kOe) | $(BH)_{max}$ (MGOe) |
|---|---|---|---|
| Example 2 | 13.42 | 17.93 | 40.1 |
| Example 3 | 13.54 | 15.4 | 40.3 |

By comparing the magnetic properties of the anisotropic nanocrystalline rare earth permanent magnets prepared in Example 2 and Comparative Example 3, it can be seen that the coercive force of the thermal extrusion-based magnetic ring is greatly improved after adding 1.0 wt. % of $Ca_{65}Cu_{35}$ alloy in Example 2. SEM results show that the main phase $Nd_2Fe_{14}B$ flaky nanocrystallines in the non-doped Nd—Fe—B thermal extrusion-based magnetic ring have an average grain size in the length direction of 240 nm and an average grain size in the thickness direction of 110 nm. There are a large number of coarse equiaxed crystals at the magnetic powder interface inside the magnetic ring. According to statistics, the volume fraction of the coarse crystal region is 11.5%. In addition, there is also a large quantity of rare earth oxide Nd—O phase at the magnetic powder interface. At the magnetic powder interface inside the thermal extrusion-based magnetic ring with 1.0 wt. % $Ca_{65}Cu_{35}$ alloy, the rare earth oxide Nd—O phase substantially disappears, and the enrichment of the Nd-rich phase at the magnetic powder interface is inhibited. The Ca—Cu phase and Ca—Cu—O phase are evenly distributed at the interface. The matrix phase includes regularly arranged main phase $Nd_2Fe_{14}B$ flaky nanocrystallines and a Nd-rich phase around main phase grains. C-axis (grain thickness direction) of the main phase $Nd_2Fe_{14}B$ flaky nanocrystallines are arranged in parallel. In addition, the grains of the main phase $Nd_2Fe_{14}B$ flaky nanocrystallines of the magnetic ring have also been refined. The main phase $Nd_2Fe_{14}B$ flaky nanocrystallines have an average grain size in the length direction of 235 nm and an average grain size in the thickness direction of 105 nm, and the flaky nanocrystallines each have a length-to-thickness ratio of 2.24. Statistics show that the volume fraction of the coarse-grained region is less than 1%, and the coarse-grained region at the interface is inhibited.

Example 3

This example provided an anisotropic nanocrystalline rare earth permanent magnet and a preparation method thereof, and the preparation method was as follows:

S1. An alloy ingot with a chemical formula of $Nd_{30.2}Fe_{62.45}Co_{5.93}Ga_{0.5}B_{0.92}$ (wt. %) was subjected to melt-spinning at a linear speed of a fast quenching roller of 25 m/s, to obtain a nanocrystalline rapidly-quenched magnetic powder with a particle size of 50 μm to 450 μm, and the nanocrystalline rapidly-quenched magnetic powder was an isotropic magnetic powder. The nanocrystalline rapidly-quenched magnetic powder was subjected to heat preservation at 730° C. for 30 min under a vacuum degree of $5\times10^{-3}$ Pa to obtain an isotropic nanocrystalline magnetic powder with a flaky crystal structure, where the flaky crystal structure had an average grain size in the length direction of 240 nm and an average grain size in the thickness direction of 95 nm. An alloy ingot with a chemical formula of $Ca_{70}Cu_{30}$ (wt. %) was mechanically crushed to obtain an alloy powder with an average particle size of 100 μm. The $Ca_{70}Cu_{30}$ alloy powder and the isotropic nanocrystalline magnetic powder with a flaky crystal structure were mixed three-dimensionally for 2 h under a protective atmosphere of argon to obtain an isotropic raw material powder. In the prepared raw material powder, the $Ca_{70}Cu_{30}$ alloy powder was added in an amount of 1.5 wt. % and 2.0 wt. % of the isotropic nanocrystalline magnetic powder with a flaky crystal structure, respectively.

S2. The raw material powder prepared in S1 was subjected to thermal processing, specifically as follows:

S2', the raw material powders of different components were directly extruded with an extruder under a vacuum degree of $1\times10^{-2}$ Pa at 680° C. to obtain an anisotropic nanocrystalline magnetic ring, wherein the magnetic ring had a diameter of 20 mm and a wall thickness of 2.5 mm. Table 3 shows the magnetic properties of the anisotropic magnetic ring.

TABLE 3

Magnetic properties of anisotropic magnetic ring

| $Ca_{70}Cu_{30}$ content | $B_r$ (kGs) | $H_{cj}$ (kOe) | $(BH)_{max}$ (MGOe) |
|---|---|---|---|
| 1.5 wt. % | 12.7 | 16.12 | 34.2 |
| 2.0 wt. % | 12.2 | 16.09 | 32.5 |

It can be seen from the magnetic properties in Table 3 that by adding the low-melting $Ca_{70}Cu_{30}$ alloy the magnetic powder could be directly extruded into an anisotropic magnetic ring. SEM results show that the Ca—Cu alloy is distributed at the magnetic powder interface, part of the Ca—Cu alloy reacts with rare earth oxides to form the Ca—Cu—O phase, and the unreacted Ca—Cu alloy remains as the Ca—Cu phase. The RE-Fe—B matrix phase inside the thermal extrusion-based magnetic ring with 1.5 wt. % of $Ca_{70}Cu_{30}$ alloy includes regularly arranged main phase $Nd_2Fe_{14}B$ flaky nanocrystallines and an Nd-rich phase around main phase grains: the main phase $Nd_2Fe_{14}B$ flaky nanocrystallines have an average grain size in a length direction of 280 nm and an average grain size in a thickness direction of 100 nm; and the flaky nanocrystallines each have a length-to-thickness ratio of 2.8. Statistics show that a volume fraction of the coarse-grained region is not more than 1%. Inside the thermal extrusion-based magnetic ring with 2.0 wt. % of $Ca_{70}Cu_{30}$ alloy, the main phase $Nd_2Fe_{14}B$ flaky nanocrystallines have an average grain size in a length direction of 279 nm and an average grain size in a thickness direction of 100 nm; and the flaky nanocrystallines each have a length-to-thickness ratio of 2.79. Statistics show that a volume fraction of the coarse-grained region is not more than 1%, indicating that interface coarse grains are inhibited.

Example 4

This example provided an anisotropic nanocrystalline rare earth permanent magnet and a preparation method thereof, and the preparation method was as follows:

S1. An alloy ingot with a chemical formula of $Nd_{30.2}Fe_{62.45}Co_{5.93}Ga_{0.5}B_{0.92}$ (wt. %) was subjected to melt-spinning at a linear speed of a fast quenching roller of 25 m/s, to obtain a nanocrystalline rapidly-quenched magnetic powder with a particle size of 50 μm to 450 μm. The nanocrystalline rapidly-quenched magnetic powder was subjected to heat preservation at 730° C. for 30 min under a vacuum degree of $5\times10^{-3}$ Pa to obtain an isotropic nanocrystalline magnetic powder with a flaky crystal structure, wherein the flaky crystal structure had an average grain size in the length direction of 240 nm and an average grain size in the thickness direction of 95 nm. The isotropic nanocrystalline magnetic powder with a flaky crystal structure was subjected to hot-rolled deformation at 750° C., and a thickness of the magnetic powder was reduced by 65%, thereby obtaining the flaky anisotropic nanocrystalline magnetic powder. The flaky magnetic powder had a length-to-thickness ratio of 1.5 to 30, and an easy magnetization direction of the flaky magnetic powder was parallel to a thickness direction of the magnetic powder. The prepared magnetic powder properties included: Br=13.6 kGs, Hci=14.5 kOe, (BH) max=43.8 MGOe. An alloy ingot with a chemical formula of $Ca_{70}Cu_{30}$ (wt. %) was mechanically crushed to obtain an alloy powder with an average particle size of 100 μm. The $Ca_{70}Cu_{30}$ alloy powder and the anisotropic nanocrystalline magnetic powder with a flaky crystal structure prepared were mixed three-dimensionally for 2 h under a protective atmosphere of argon to obtain an anisotropic raw material powder. In the prepared raw material powder, the $Ca_{70}Cu_{30}$ alloy powder was in an amount of 1.0 wt. % of a mass of the anisotropic nanocrystalline magnetic powder.

S2. The raw material powder prepared in S1 was subjected to thermal processing, specifically as follows:

S2', the raw material powder was subjected to hot pressing sintering under a vacuum degree of $1\times10^{-2}$ Pa at 680° C. and a pressure of 200 MPa for 5 min, and the parallel arrangement of the flaky anisotropic magnetic powder was promoted through the uniaxial pressure to obtain the anisotropic magnet.

Comparative Example 4

Comparative Example 4 was different from Example 4 in that the $Ca_{70}Cu_{30}$ alloy powder was not added in Comparative Example 4, while the remaining preparation steps were the same as those in Example 4. Table 4 shows the magnetic properties of the anisotropic magnets prepared in Example 4 and Comparative Example 4.

TABLE 4

Magnetic properties of anisotropic magnet

| | $B_r$ (kGs) | $H_{cj}$ (kOe) | $(BH)_{max}$ (MGOe) |
|---|---|---|---|
| Example 4 | 12.9 | 14.1 | 37.5 |
| Comparative Example 4 | 13.1 | 12.3 | 38.2 |

It can be seen from Table 4 that: an appropriate amount of Ca—Cu alloy in Example 4 could significantly improve the coercive force of the mechanically-oriented anisotropic magnet. SEM results show that there is a large quantity of rare earth oxides at the magnetic powder interface inside the anisotropic magnet without adding Ca—Cu alloy, and the volume fraction of the coarse-grained region is 14%; the main phase $Nd_2Fe_{14}B$ flaky nanocrystallines have an average grain size in the length direction of 280 nm and an average grain size in the thickness direction of 120 nm, and the flaky nanocrystallines each have a length-to-thickness ratio of 2.33. In the anisotropic magnet with Ca—Cu alloy in Example 4, the Nd—Fe—B matrix phase includes regularly arranged main phase $Nd_2Fe_{14}B$ flaky nanocrystallines and an Nd-rich phase around main phase grains. The main phase $Nd_2Fe_{14}B$ flaky nanocrystallines have an average grain size in the length direction of 275 nm and an average grain size in the thickness direction of 115 nm, and the flaky nanocrystallines each have a length-to-thickness ratio of 2.39. The rare earth oxides at the magnetic powder interface substantially disappear, and the Ca—Cu phase and Ca—Cu—O phase are evenly distributed at the interface. In addition, the coarse-grained region at the magnetic powder interface substantially disappears, and a volume fraction of the coarse-grained region is calculated to be 2%.

Example 5

This example provided an anisotropic nanocrystalline rare earth permanent magnet and a preparation method thereof, where the preparation method was as follows:

S1. An alloy ingot with a chemical formula of $Nd_{30.2}Fe_{62.45}Co_{5.93}Ga_{0.5}B_{0.92}$ (wt. %) was subjected to melt-spinning at a linear speed of a fast quenching roller of 25 m/s, to obtain a nanocrystalline rapidly-quenched magnetic powder with a particle size of 50 μm to 450 μm. The nanocrystalline rapidly-quenched magnetic powder was subjected to heat preservation at 730° C. for 30 min under a vacuum degree of $5\times10^{-3}$ Pa to obtain an isotropic nanocrystalline magnetic powder with a flaky crystal structure, wherein an average grain size in the length direction of the flaky crystal structure was 240 nm, and an average grain size in the thickness direction thereof was 95 nm. The isotropic nanocrystalline magnetic powder with a flaky crystal structure was subjected to hot-rolled deformation at 750° C., and a thickness of the magnetic powder was reduced by 65%, thereby obtaining the flaky anisotropic nanocrystalline magnetic powder. The flaky magnetic powder had a length-to-thickness ratio of 1.5 to 30, and an easy magnetization direction of the flaky magnetic powder was parallel to a thickness direction of the magnetic powder. The prepared magnetic powder properties included: Br=13.6 kGs, Hci=14.5 kOe, (BH) max=43.8 MGOe. An alloy ingot with a chemical formula of $Mg_{85.5}Cu_{14.5}$ (wt. %) was mechanically crushed to obtain an alloy powder with an average particle size of 100 μm. The $Mg_{85.5}Cu_{14.5}$ alloy powder and the anisotropic nanocrystalline magnetic powder with a flaky crystal structure prepared were mixed three-dimensionally for 2 h under a protective atmosphere of argon to obtain an anisotropic raw material powder. In the prepared raw material powder, the $Mg_{85.5}Cu_{14.5}$ alloy powder was added in an amount of 0.5 wt. %, 1.0 wt. %, and 2.0 wt. % of the flaky anisotropic nanocrystalline magnetic powder, respectively.

S2. The raw material powder prepared in S1 was subjected to thermal processing, specifically as follows:

S2.1, the raw material powder was subjected to oriented molding under an external magnetic field of 2 T under a pressure of 50 MPa to obtain a molded green body; and S2.2', the molded green body was vacuum-sintered under a vacuum degree of $1\times10^{-2}$ Pa at 680° C. for 20 min to obtain the anisotropic nanocrystalline permanent magnet.

Comparative Example 5

Comparative Example 5 was different from Example 5 in that the $Mg_{85.5}Cu_{14.5}$ alloy powder was not added in Comparative Example 5, while the remaining preparation steps were the same as those in Example 5. Table 5 shows the magnetic properties of the anisotropic magnets prepared in Example 5 and Comparative Example 5.

TABLE 5

Magnetic properties of anisotropic magnets

| | $B_r$ (kGs) | $H_{cj}$ (kOe) | $(BH)_{max}$ (MGOe) |
|---|---|---|---|
| 0 wt. % | 13.41 | 12.1 | 40.09 |
| 0.5 wt. % | 13.31 | 12.9 | 39.91 |
| 1.0 wt. % | 13.22 | 14.1 | 39.82 |
| 2.0 wt. % | 13.02 | 13.2 | 38.84 |

As shown in Table 5, the addition of a certain amount of the $Mg_{85.5}Cu_{14.5}$ alloy could significantly improve a coercive force of anisotropic nanocrystalline magnet, and the amount is optimally 0.5-1.0 wt. %. The SEM results show that in the sintered nanocrystalline magnet without Mg—Cu alloy added in Comparative Example 5, the main phase $Nd_2Fe_{14}B$ flaky nanocrystallines have an average grain size in the length direction of 280 nm and an average grain size in the thickness direction of 105 nm, and there are coarse grains in the magnetic powder interface, statistics show that the volume fraction of the coarse-grained region is 14.5%. Further, there is a large quantity of rare earth oxides at the magnetic powder interface. In Example 5, in the sintered nanocrystalline magnet with 0.5 wt. % Mg—Cu alloy, the Nd—Fe—B matrix phase includes regularly arranged main phase $Nd_2Fe_{14}B$ flaky nanocrystallines and an Nd-rich phase around main phase grains. C-axis (grain thickness direction) of the main phase $Nd_2Fe_{14}B$ flaky nanocrystallines are arranged in parallel, the main phase $Nd_2Fe_{14}B$ flaky nanocrystallines have an average grain size in the length direction of 278 nm and an average grain size in the thickness direction of 102 nm, and the flaky nanocrystallines each have a length-to-thickness ratio of 2.73, there are coarse grains at some magnetic powder interfaces. Statistics show that the volume fraction of the coarse-grained region is 10%. After further increasing the Mg—Cu alloy content to 1.0 wt. %, the main phase $Nd_2Fe_{14}B$ flaky nanocrystallines have an average grain size in the length direction of 275 nm and an average grain size in the thickness direction of 101 nm, and the flaky nanocrystallines each have a length-to-thickness ratio of 2.72. Statistics show that the volume fraction of the coarse-grained region is 2.5%. When the Mg—Cu alloy content reaches 2.0 wt. %, the main phase $Nd_2Fe_{14}B$ flaky nanocrystallines have an average grain size in the length direction of 275 nm and an average grain size in the thickness direction of 100 nm, and the flaky nanocrystallines each have a length-to-thickness ratio of 2.75. Statistics show that the volume fraction of the coarse-grained region is 2.5%. Therefore, an appropriate amount of Mg—Cu alloy could inhibit the formation of coarse grains at the interface. In addition, after the addition amount of Mg—Cu alloy powder reaches 1.0 wt. %, on one hand, the rare earth oxide at the interface of the sintered magnet substantially disappears, and the Mg—Cu phase and Mg—Cu—O phase are evenly distributed at the interface. On the other hand, the enrichment of the Nd-rich phase at the magnetic powder interface is also inhibited, thereby increasing the Nd-rich phase content between the main phase grains inside the magnetic powder, enhancing the pinning effect of the grain boundaries on the magnetic domain walls, and improving the coercive force of the magnet.

It should be understood that those of ordinary skill in the art can make improvements or transformations based on the above description, and all these improvements and transformations should fall within the protection scope of the appended claims of the present disclosure.

What is claimed is:

1. A method for preparing an anisotropic nanocrystalline rare earth permanent magnet, the anisotropic nanocrystalline rare earth permanent magnet comprising an RE-Fe—B matrix phase and a second phase, wherein the RE-Fe—B matrix phase comprises main phase $RE_2Fe_{14}B$ flaky nanocrystallines regularly arranged and an RE-rich phase around main phase grains, the main phase $RE_2Fe_{14}B$ flaky nanocrystallines having an average grain size in a length direction of 70 nm to 800 nm, and an average grain size in a thickness direction of 30 nm to 200 nm, and each having a length-to-thickness ratio of greater than 1.2;

the RE-Fe—B matrix phase comprises a coarse-grained region having a volume fraction of not less than 0.5% and not more than 10%, which is calculated based on a volume of the coarse-grained region and a volume of the anisotropic nanocrystalline rare earth permanent magnet, the coarse-grained region being an equiaxed grain region with a grain size of greater than 500 nm; and the second phase comprises at least one selected from the group consisting of an M-Cu phase and an M-Cu—O phase, M being Ca, or a combination of Ca and Mg;

the method comprising the steps of

S1, mixing an RE-Fe—B magnetic powder with an M-Cu alloy powder to obtain a raw material powder, wherein M is Ca, or a combination of Ca and Mg, the RE-Fe—B magnetic powder comprises at least one selected from the group consisting of an anisotropic magnetic powder and an isotropic magnetic powder, and the raw material powder obtained by mixing comprises at least one selected from the group consisting of an anisotropic raw material powder and an isotropic raw material powder; and S2, subjecting the raw material powder obtained in S1 to thermal processing, such that the main phase $RE_2Fe_{14}B$ flaky nanocrystallines are regularly arranged, to obtain the anisotropic nanocrystalline rare earth permanent magnet.

2. The method as claimed in claim 1, wherein the RE-Fe—B magnetic powder has a formula of $RE_xFe_{100-x-y-z}TM_yB_z$, wherein RE is at least one selected from the group consisting of La, Ce, Pr, Nd, Y, Dy, Tb, and Ho;

TM is at least one selected from the group consisting of Co, Zr, Cr, V, Nb, Si, Ti, Mo, Mn, W, Ga, Cu, Al, and Zn; and x, y, and z each represent a mass fraction of an element, and satisfy inequalities: $26.0 \leq x \leq 36.0$, $0.14 \leq y \leq 8.0$, and $0.8 \leq z \leq 1.36$.

3. The method as claimed in claim 1, wherein the M-Cu alloy powder is in an amount of 0.1 wt. % to 5.0 wt. % based on a mass of the RE-Fe—B magnetic powder; wherein under the condition that the M-Cu alloy powder is a Ca—Cu alloy powder, the Ca—Cu alloy powder has a Cu mass percentage of 10 wt. % to 60 wt. %; and under the condition that the M-Cu alloy powder is a Ca—Mg—Cu alloy powder, the Ca—Mg—Cu alloy powder has a Cu mass percentage of 10 wt. % to 50 wt. %.

4. The method as claimed in claim 1, wherein the coarse-grained region in the RE-Fe—B matrix phase has the volume fraction of not less than 0.5% and not more than 1%, which is calculated based on a volume of the coarse-grained region and a volume of the anisotropic nanocrystalline rare earth permanent magnet.

5. The method as claimed in claim 1, wherein the M-Cu alloy powder has an average particle size of 100 μm to 300 μm.

6. The method as claimed in claim 1, wherein the M-Cu alloy powder has an average particle size of 100 μm to 200 μm.

7. The method as claimed in claim 1, wherein the thermal processing in S2 comprises at least one selected from the group consisting of thermal deformation, thermal extrusion deformation, magnetic field-oriented sintering molding, and mechanically-oriented sintering molding.

8. The method as claimed in claim 7, wherein the thermal deformation comprises the steps of S2.1, preparing the raw material powder at a temperature ranging from room temperature to 800° C. into a green body with a density of 50% to 99.99%; and S2.2, subjecting the green body to the thermal deformation at a temperature of 600° C. to 850° C. to reach a deformation amount of 30% to 90% at a deformation rate of 0.01 mm/s to 3.5 mm/s such that the main phase $RE_2Fe_{14}B$ flaky nanocrystallines are regularly arranged.

9. The method as claimed in claim 7, wherein the thermal extrusion deformation comprises the steps of S2.1, preparing the raw material powder at a temperature ranging from room temperature to 800° C. into a green body with a density of 50% to 99.99%; and S2.2, subjecting the green body to the thermal extrusion deformation at a temperature of 600° C. to 850° C. such that the main phase $RE_2Fe_{14}B$ flaky nanocrystallines are regularly arranged; or a step of S2' subjecting the raw material powder to the thermal extrusion deformation at a temperature of 600° C. to 850° C. such that the main phase $RE_2Fe_{14}B$ flaky nanocrystallines are regularly arranged.

10. The method as claimed in claim 7, wherein the magnetic field-oriented sintering molding comprises the steps of:

S2.1, subjecting the anisotropic raw material powder to oriented molding under an external magnetic field of 1 T to 3 T, to obtain a molded green body; and S2.2, subjecting the molded green body to hot pressing sintering, wherein the hot pressing sintering is conducted at a temperature of 450° C. to 850° C. and a pressure of 50 MPa to 500 MPa for 1 min to 60 min, or S2.2', subjecting the molded green body to pressureless sintering, wherein the pressureless sintering is conducted at a temperature of 600° C. to 850° C. for 10 min to 120 min.

11. The method as claimed in claim 7, wherein the mechanically-oriented sintering molding comprises the steps of S2', subjecting the anisotropic raw material powder to hot-pressing oriented sintering at a temperature of 450° C. to 850° C. under a uniaxial pressure of 50 MPa to 500 MPa for 1 min to 60 min, wherein the RE-Fe—B magnetic powder of the anisotropic raw material powder is a flaky magnetic powder with a length-to-thickness ratio of 1.2 to 30; and the flaky magnetic powder has an easy magnetization direction parallel to a thickness direction of the flaky magnetic powder; or the steps of S2.1", subjecting the anisotropic raw material powder to cold pressing molding at room temperature under a uniaxial pressure to obtain a molded green body, wherein the RE-Fe—B magnetic powder of the anisotropic raw material powder is a flaky magnetic powder with a length-to-thickness ratio of 1.2 to 30; the flaky magnetic powder has an easy magnetization direction parallel to a thickness direction of the flaky magnetic powder; and the molded green body has a density of 40% to 70%; and S2.2", subjecting the molded green body to pressure-less sintering at a temperature of at 600° C. to 850° C. for 10 min to 120 min.

* * * * *